J. B. LADD.
METHOD AND MEANS FOR BRICK HACKING.
APPLICATION FILED JULY 19, 1919.
1,418,658.
Patented June 6, 1922.
25 SHEETS—SHEET 3.
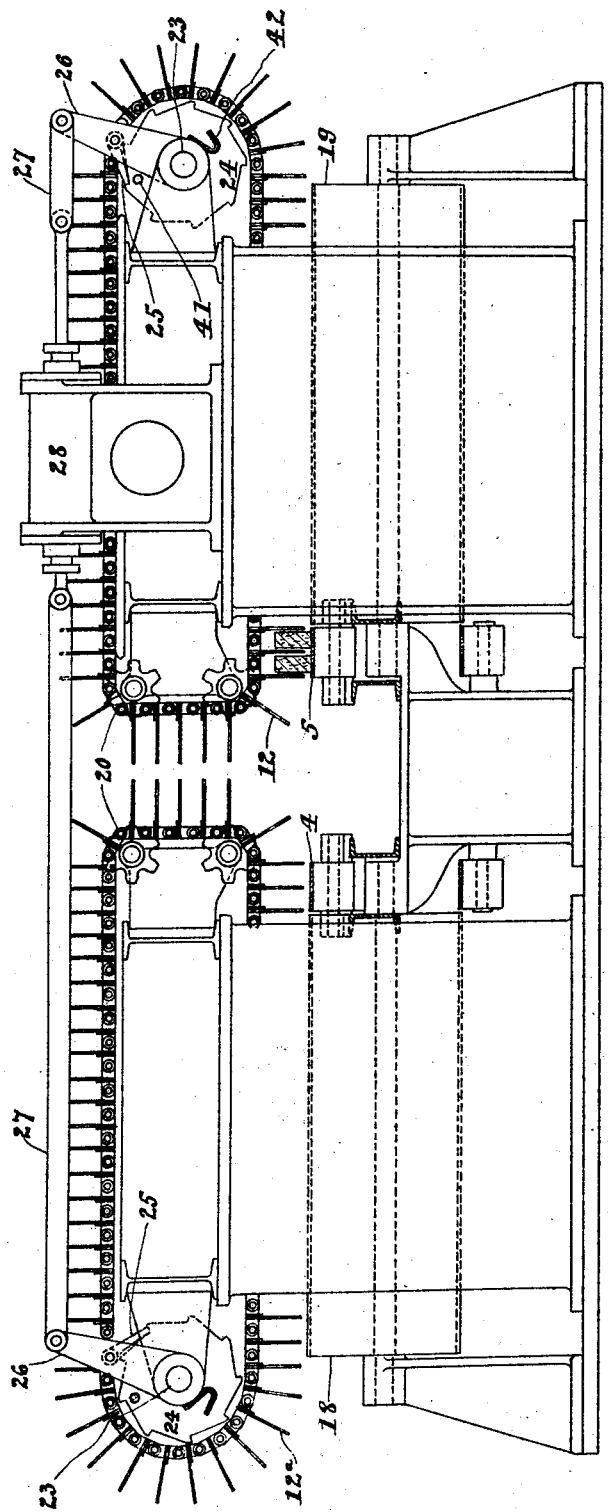
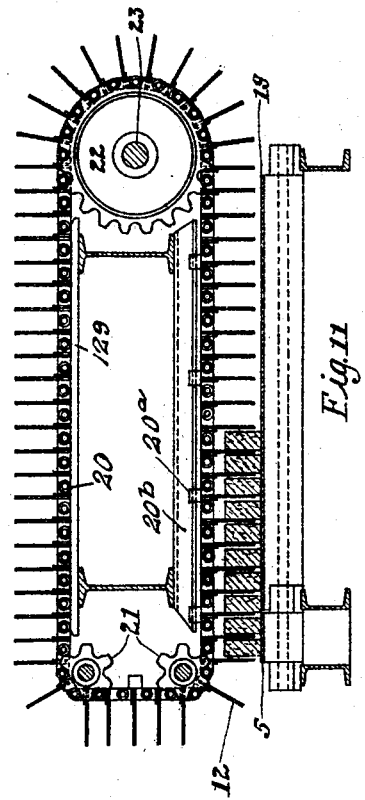
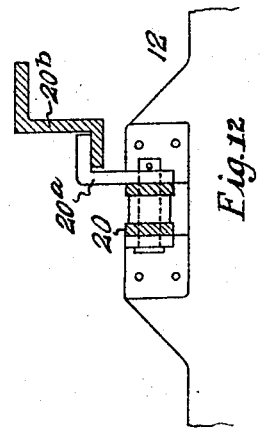
Inventor:
James B. Ladd
By /s/ Attorney

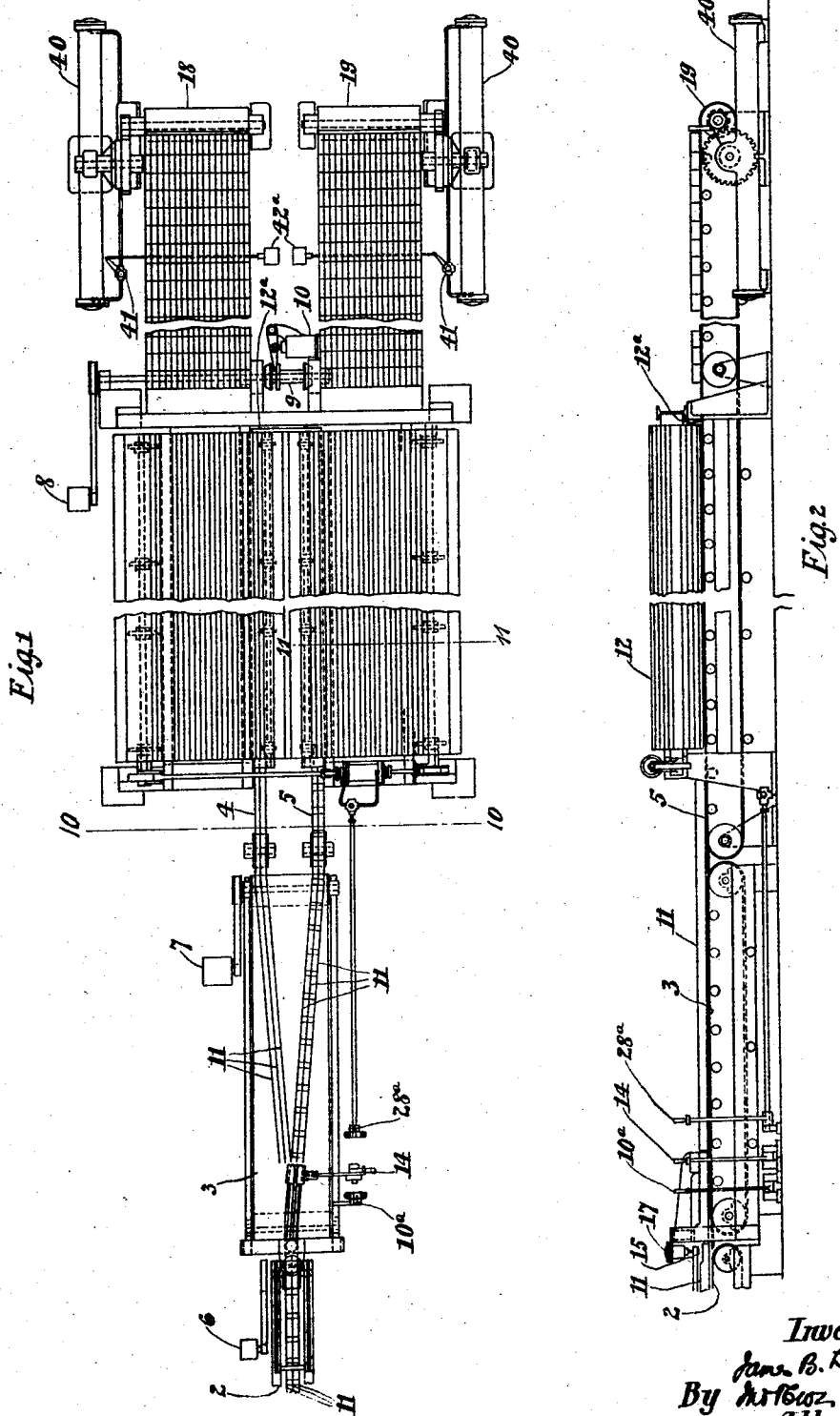

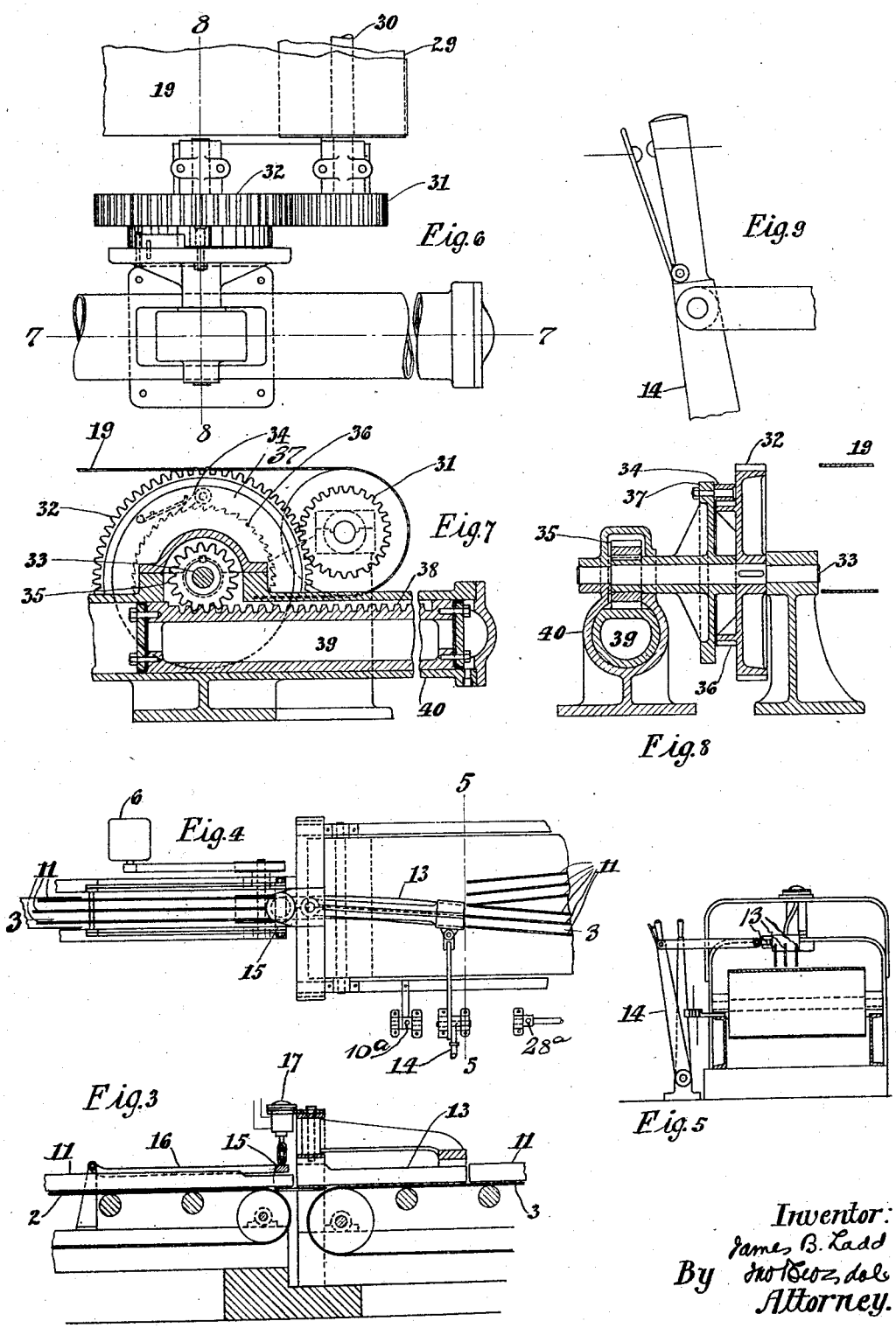

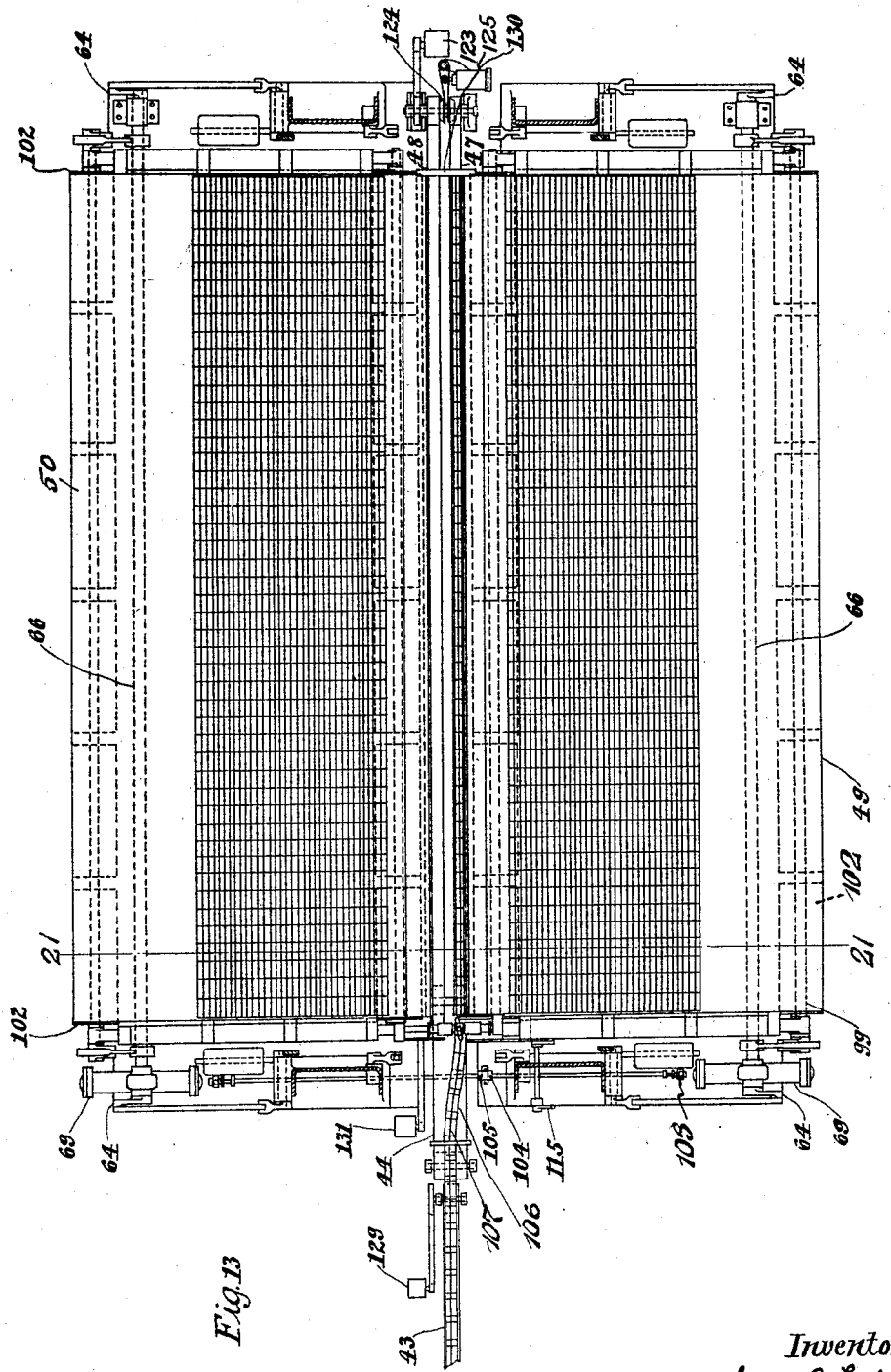

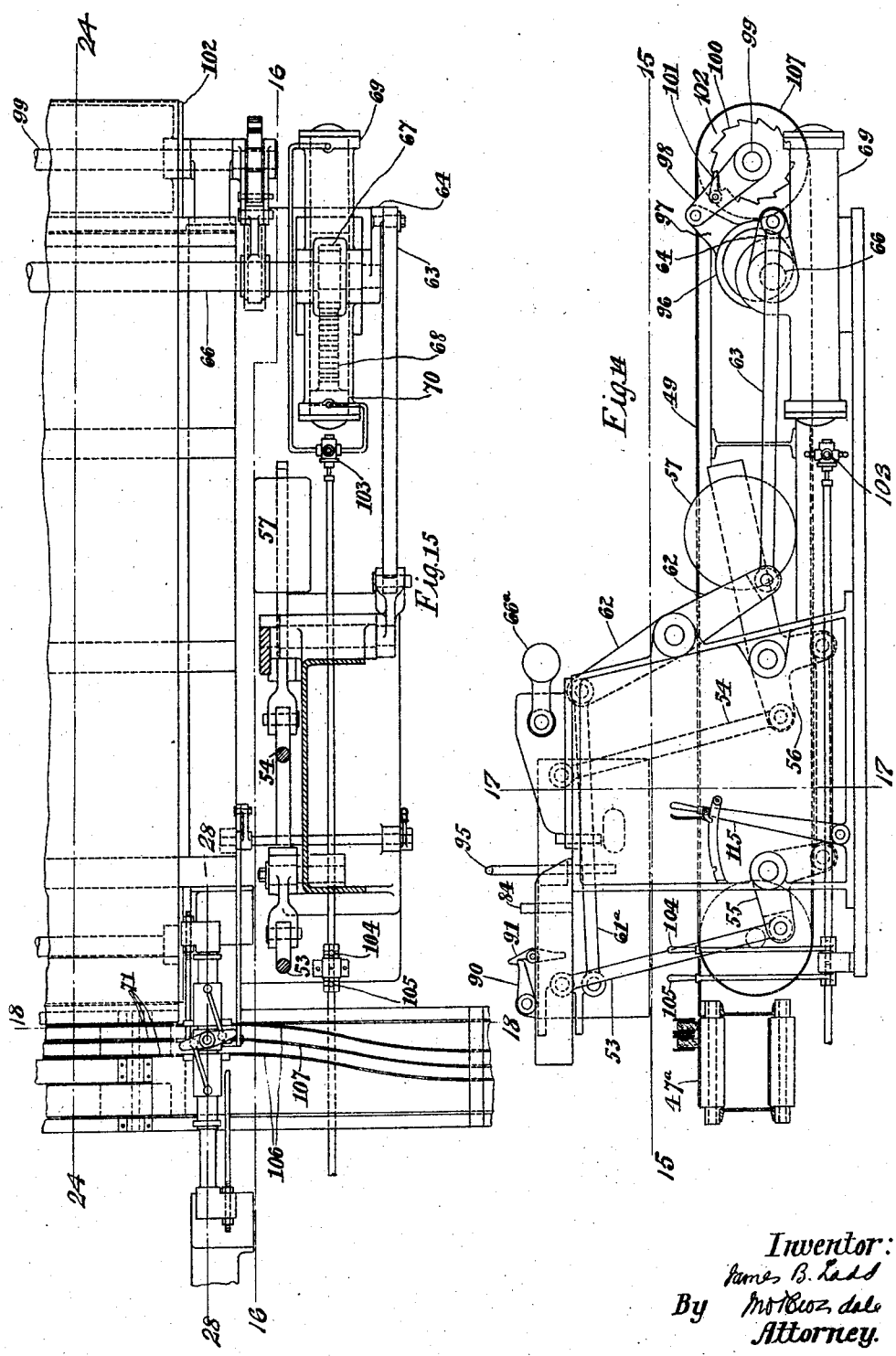

J. B. LADD.
METHOD AND MEANS FOR BRICK HACKING.
APPLICATION FILED JULY 19, 1919.
1,418,658.
Patented June 6, 1922.
25 SHEETS—SHEET 6.
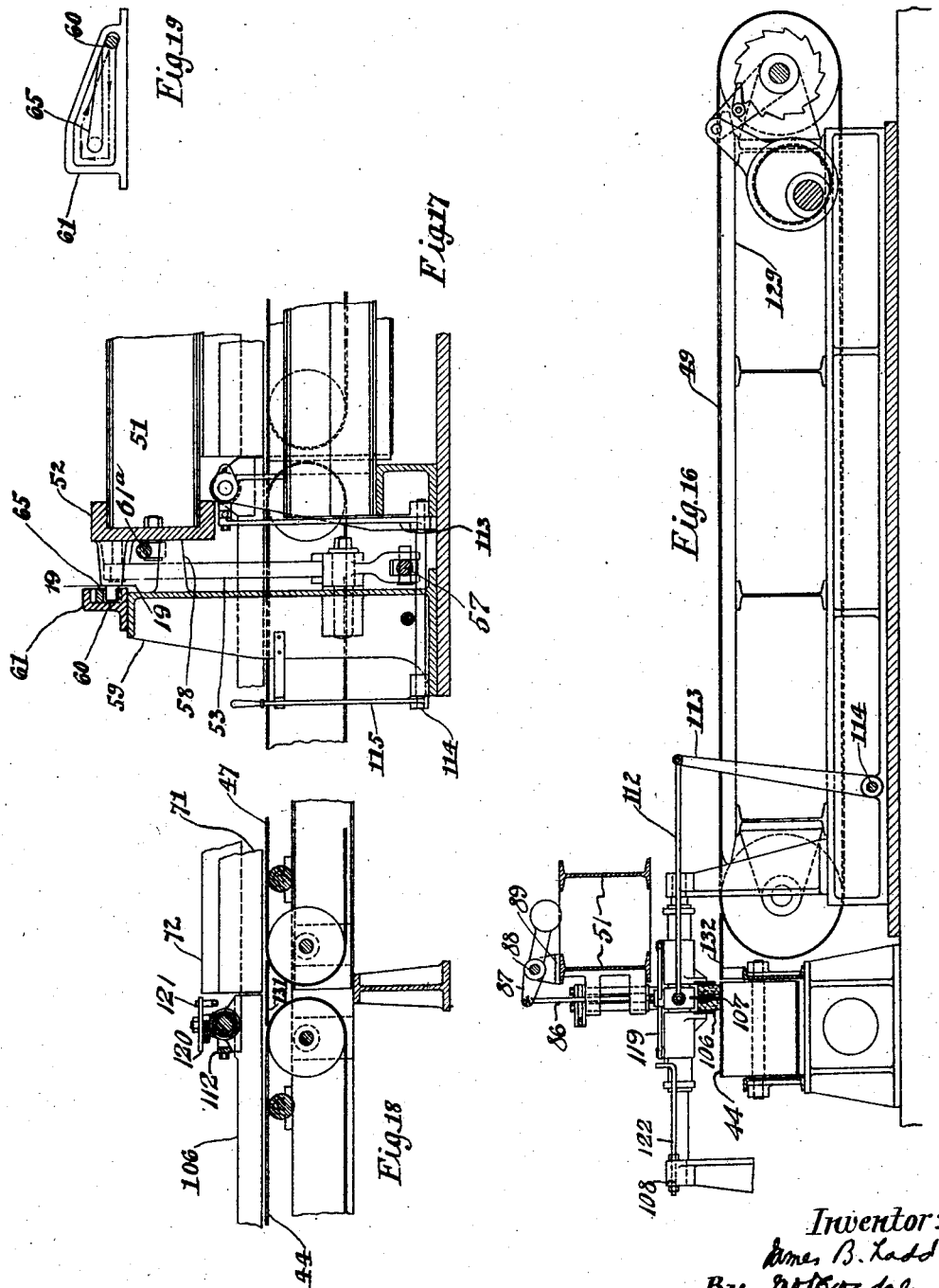

J. B. LADD.
METHOD AND MEANS FOR BRICK HACKING.
APPLICATION FILED JULY 19, 1919.

1,418,658.

Patented June 6, 1922.
25 SHEETS—SHEET 7.

Inventor:
James B. Ladd
By MoBroxdale
Attorney.

J. B. LADD.
METHOD AND MEANS FOR BRICK HACKING.
APPLICATION FILED JULY 19, 1919.

1,418,658.

Patented June 6, 1922.
25 SHEETS—SHEET 8.

Inventor:
James B Ladd
By Molesworthdale
Attorney.

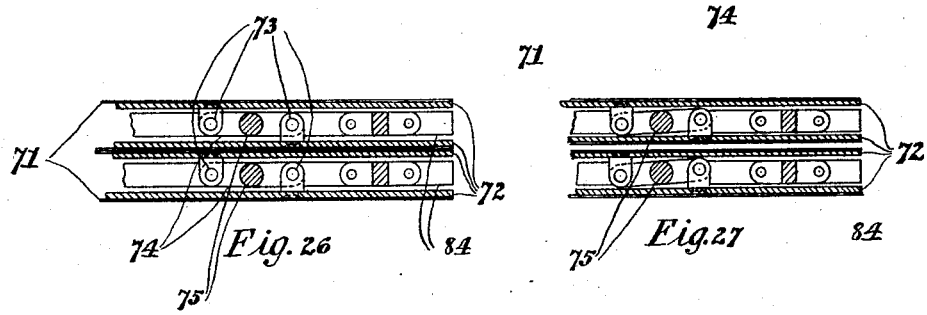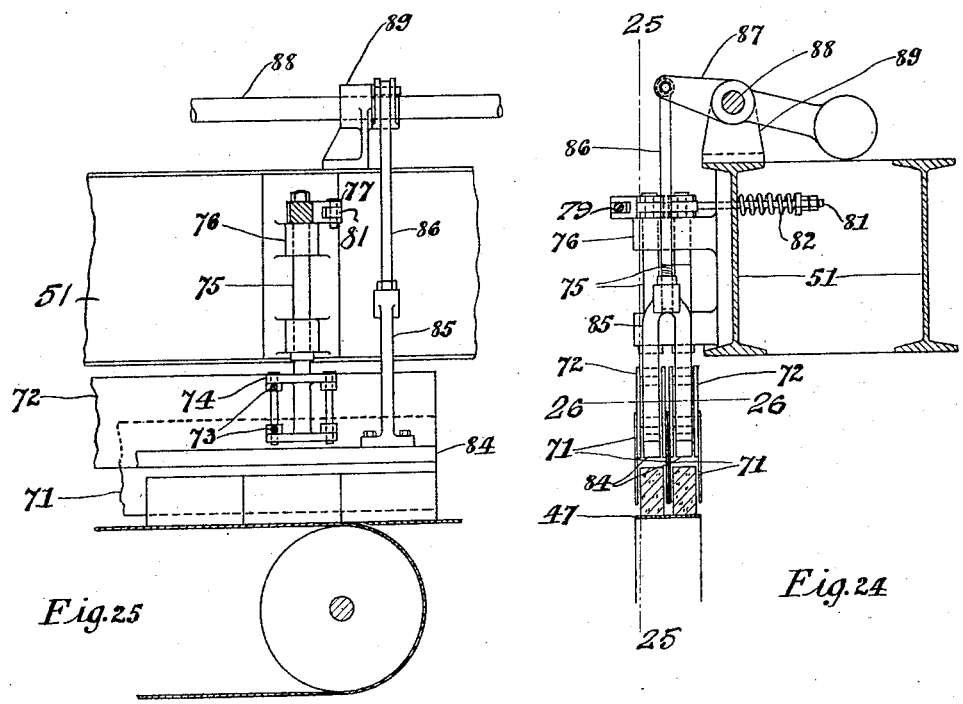

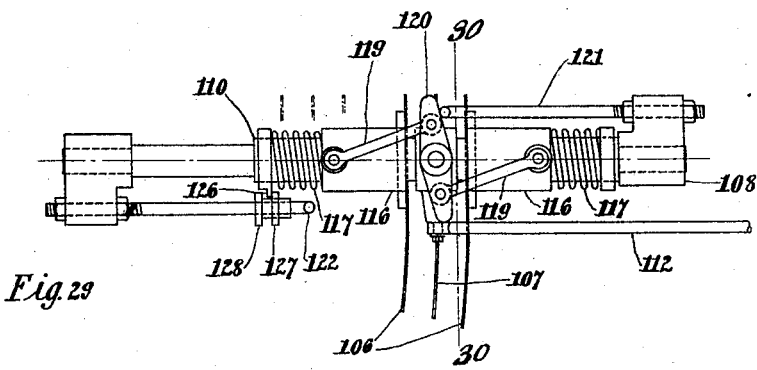
Fig. 29
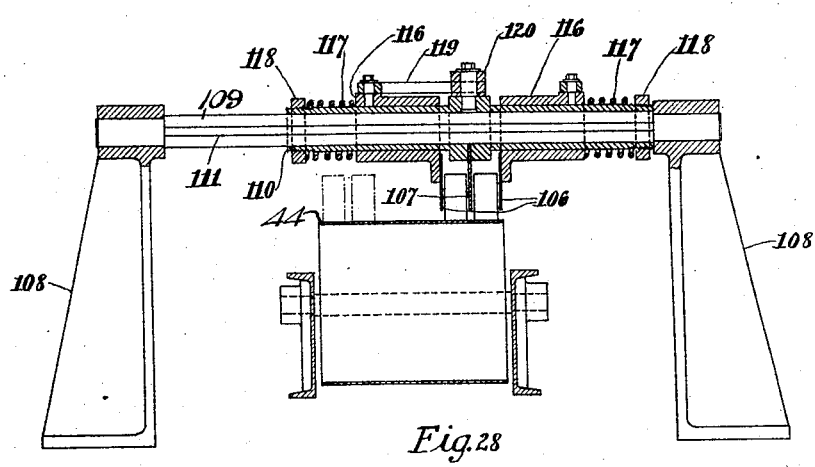
Fig. 28
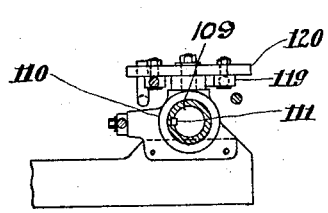
Fig. 30
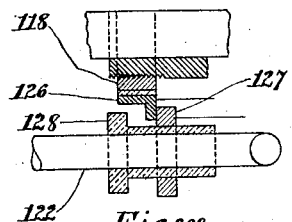
Fig. 30ª

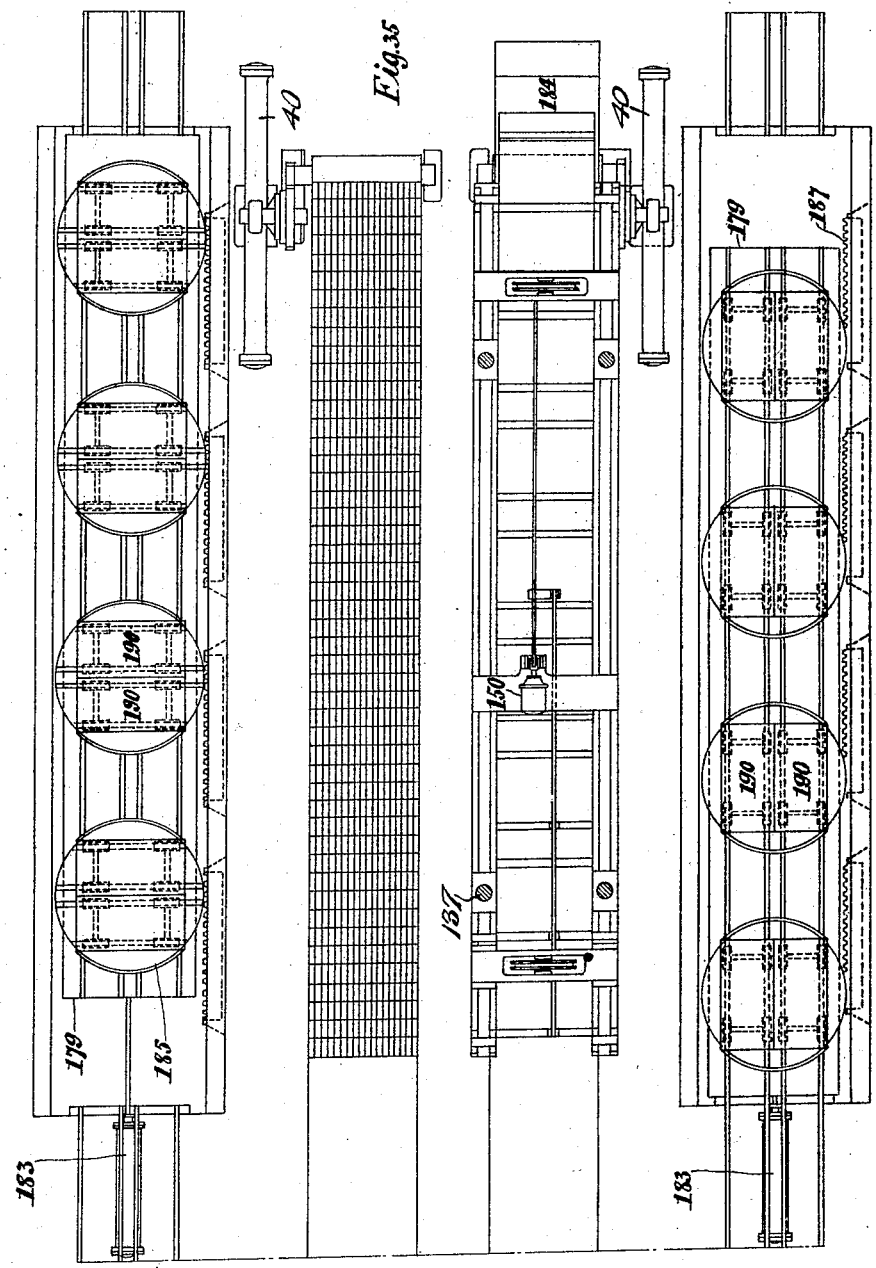

J. B. LADD.
METHOD AND MEANS FOR BRICK HACKING.
APPLICATION FILED JULY 19, 1919.

1,418,658.

Patented June 6, 1922.

Inventor:
James B. Ladd
By [signature]
Attorney.

J. B. LADD.
METHOD AND MEANS FOR BRICK HACKING.
APPLICATION FILED JULY 19, 1919.
1,418,658.
Patented June 6, 1922.
25 SHEETS—SHEET 15.
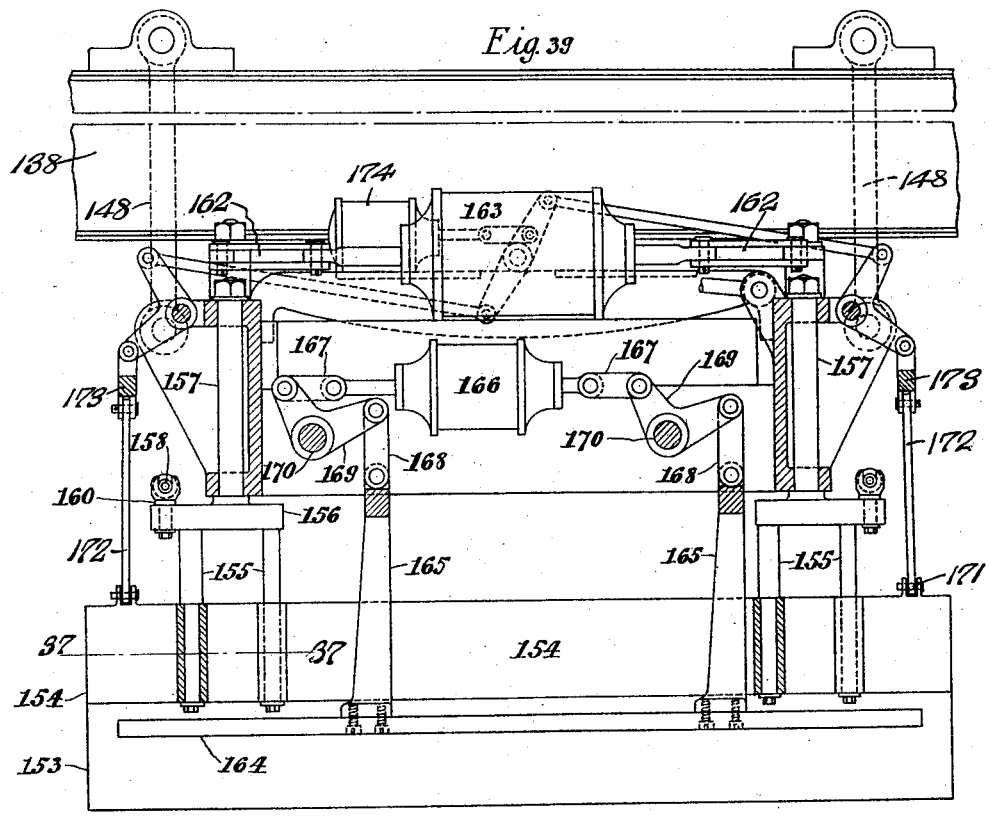
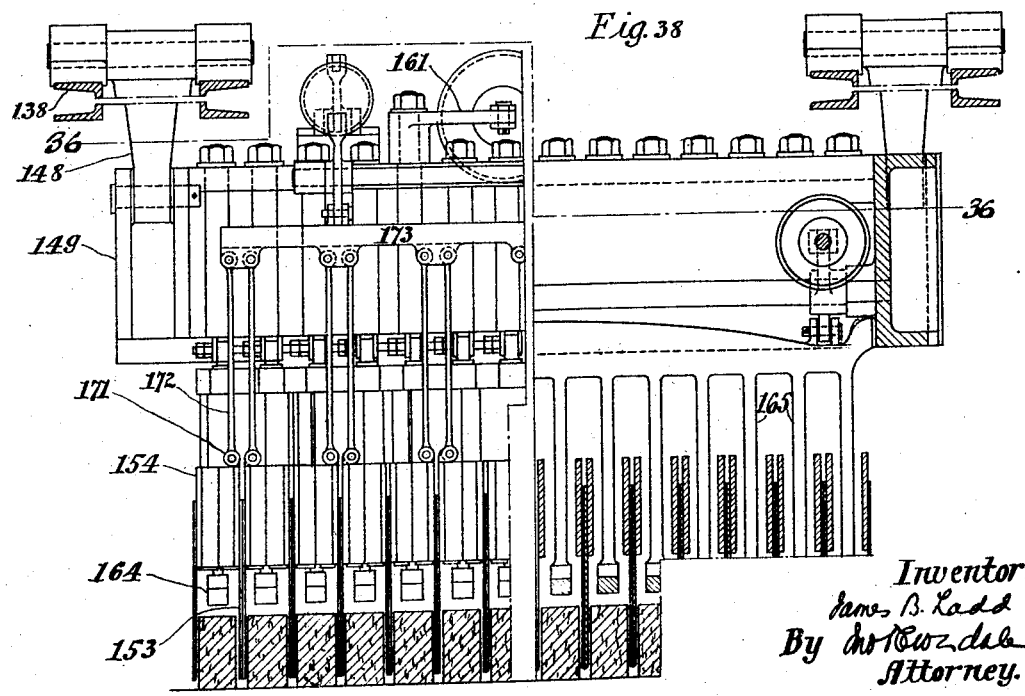
Inventor:
James B. Ladd
By Thos. Ewzdale
Attorney.

J. B. LADD.
METHOD AND MEANS FOR BRICK HACKING.
APPLICATION FILED JULY 19, 1919.

1,418,658.

Patented June 6, 1922.

Inventor:
James B. Ladd
By Geo. Croasdale
Attorney.

J. B. LADD.
METHOD AND MEANS FOR BRICK HACKING.
APPLICATION FILED JULY 19, 1919.

1,418,658.

Patented June 6, 1922.
25 SHEETS—SHEET 18.

Inventor:
James B. Ladd
By Thos. Ewzdale
Attorney

J. B. LADD.
METHOD AND MEANS FOR BRICK HACKING.
APPLICATION FILED JULY 19, 1919.

1,418,658.

Patented June 6, 1922.
25 SHEETS—SHEET 23.

Inventor:
James B. Ladd
By _____
Attorney

J. B. LADD.
METHOD AND MEANS FOR BRICK HACKING.
APPLICATION FILED JULY 19, 1919.
1,418,658.
Patented June 6, 1922.
25 SHEETS—SHEET 24.
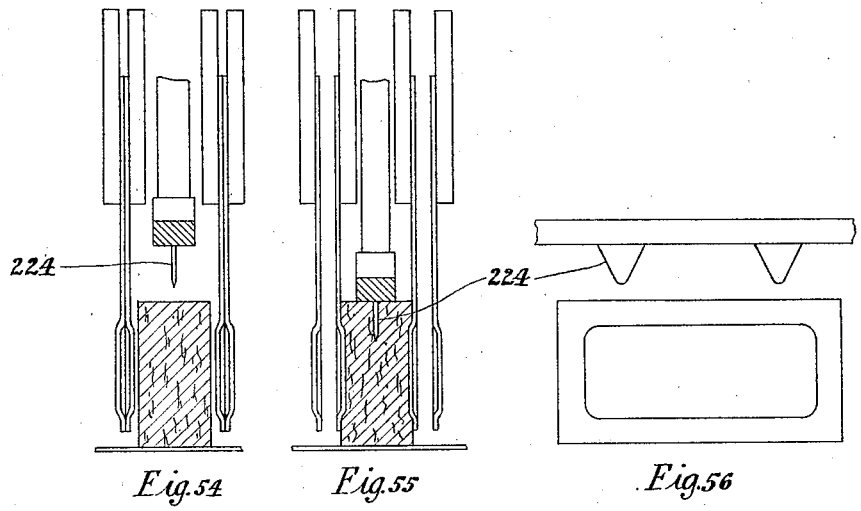
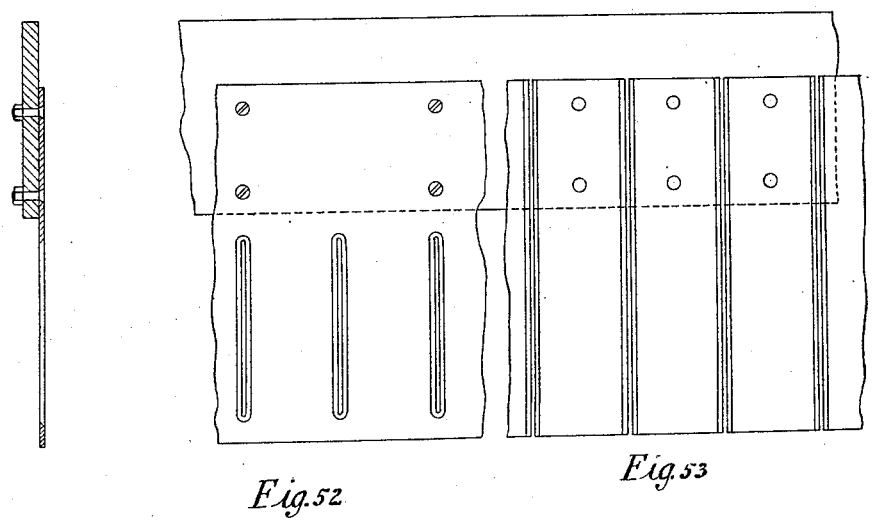
Inventor:
James B. Ladd
By  Attorney.

J. B. LADD.
METHOD AND MEANS FOR BRICK HACKING.
APPLICATION FILED JULY 19, 1919.

1,418,658.

Patented June 6, 1922.

Inventor:
James B. Ladd
By [signature]
Attorney.

UNITED STATES PATENT OFFICE.

JAMES B. LADD, OF ARDMORE, PENNSYLVANIA.

METHOD AND MEANS FOR BRICK HACKING.

1,418,658.   Specification of Letters Patent.   Patented June 6, 1922.

Application filed July 19, 1919. Serial No. 312,019.

*To all whom it may concern:*

Be it known that I, JAMES B. LADD, a citizen of the United States, residing at Ardmore, in the county of Montgomery, State of Pennsylvania, have invented a new and useful Method and Means for Brick Hacking, of which the following is a specification.

The invention relates to "hacking" bricks with a minimum amount of manual labor, and particularly to "hacking" large numbers of bricks per unit of time.

Modern brick forming machines deliver several hundred bricks per minute, and the usual practice today is for men to lift the green bricks by hand from the off bearing belts and place them by hand in properly spaced stacked formation on cars for drying. To handle an output of 800 bricks per minute as many as 30 men are employed solely for "hacking", and their work is hard, as each man handles over 25 bricks each minute.

Various mechanical means for hacking bricks have been devised and have failed, mainly because they can transfer to the drying cars but a few bricks at one time.

Some mechanical devices are limited to handling to the cars at one time only the number of rows of bricks produced by the brick machine, and others are limited to delivering to but one car at a time.

This limitation to handling on to the cars only a few brick at one time is practically prohibitive on account of the short interval of time available when the output is large.

The necessity for time in hacking bricks is evident in that to transfer bricks from any point on to cars necessarily includes lifting the bricks about three (3) feet and moving them sidewise about six (6) feet, and the hacking mechanism must be accurately located, both when receiving the bricks and when depositing the bricks on to the cars.

For continuous service of eight (8) hours per day it is believed that any brick hacking carrier will require at least one minute for a full cycle of its motions.

Assuming a one minute interval per cycle correct, take for example a two-strand auger machine producing eight hundred (800) bricks per minute, and cars carrying about fifty (50) brick per layer, which are usual equipment.

If the hacking mechanism can at one operation handle on to the cars only the two rows of brick produced by the brick machine, each row must contain four hundred (400) bricks, which, for nine (9) inch bricks, means that the rows of bricks and the hacking mechanism must be three hundred (300) feet long.

If the hacking mechanism can at one operation deliver but one layer of fifty (50) bricks per minute, at least sixteen (16) hacking carriers will be required.

While the above figures may be varied somewhat, it is belived that they show clearly the importance of the hacking means herein set forth, with which for the above conditions two men will hack eight hundred (800) bricks per minute with a carrier but thirty-six (36) feet long.

Briefly, while other devices have merely enlarged on the hand labor method of hacking a few bricks at a time, this invention provides for placing a full layer of brick on to a number of cars at one operation; and by handling at each lifting operation a large number of bricks, say 1,000 or several thousand bricks, it affords ample time for the necessary motions.

The invention comprises means for placing complete layers of bricks on to several cars at the same time, and for placing succeeding layer on the cars at right angles with the preceding layers, or in line with them if desired.

While some mechanical hacking devices provide for lifting the bricks in bunches when moving, the best practice is to assemble the bricks at rest properly spaced, prior to lifting them on to the cars.

Attempts have been made to bring the bricks to rest in bunches, each bunch the length of one car.

This invention comprises means for assembling at rest any number of bricks in any number of long parallel properly spaced rows, free to be lifted from above with each brick abutting end to end with the adjacent bricks in its row and with the end bricks of all the rows in line.

The support on which the bricks are assembled at rest prior to lifting is hereinafter called a "hacking table", and usually consists of a flat surface such as a belt or the like.

The drying cars on to which the brick are hacked are generally narrow compared with their length, and to permit of handling the bricks on to such cars in square lots, this invention provides for using two or more cars assembled so that their combined surfaces form a square, depositing square lots of properly spaced bricks on the combined surfaces of the cars and then separating the cars to facilitate drying the bricks.

To assemble the brick at rest in long parallel rows, this invention provides for allowing the bricks from the off bearing belt to flow on to a receiving belt until the receiving belt has become filled with bricks all abutted end to end, and then diverting the flow of bricks from the off bearing belt on to another receiving belt, at the same time bringing the first receiving belt to rest, and during the filling with bricks of the second receiving belt, sliding or lifting the bricks sidewise from the first receiving belt on to a hacking table.

The means for diverting the flow of bricks from one receiving belt to another are hereinafter called "switching" means.

The invention also comprises means for accurately locating bricks on hacking tables, means for accurately locating bricks on cars, means for lifting and separating bricks assembled on hacking tables into square lots, means for transferring bricks in square lots from hacking tables to cars, means for shifting and partially rotating the cars, and other means hereinafter described.

This application is in part a substitute for, or a continuation of my pending application, Serial No. 250,002, filed August 15th, 1918.

To clearly illustrate the invention I have shown in the accompanying drawings two methods of assembling the bricks on hacking tables, and refer to same as assembling means No. 1 and No. 2 respectively; and I have shown two methods of transferring bricks from hacking tables to cars, and refer to same as lifting means No. 1 and No. 2 respectively.

I have also shown two methods of switching bricks one with assembling means No. 1 and another with assembling means No. 2, and refer to same as switching means No. 1 and No. 2 respectively.

The drawings illustrate, merely by way of example, means for carrying out my invention when the bricks are supplied on an off-bearing belt in two rows as they would come from a two-strand auger machine, but my invention is applicable to hacking bricks supplied in one row or in any number of rows, and I therefore do not limit it to the means shown in the drawings.

Referring to the accompanying drawings:
Fig. 1 is a plan view of assembling means No. 1.
Fig. 2 is a side elevation of Fig. 1.
Fig. 3 is a side elevation of switching means No. 1.
Fig. 4 is a plan view of Fig. 3.
Fig. 5 is a sectional elevation on line 5, 5 of Fig. 4.
Fig. 6 is a plan view of means for moving the hacking table of assembling means No. 1.
Fig. 7 is a sectional elevation on line 7, 7 of Fig. 6.
Fig. 8 is a sectional elevation on line 8, 8 of Fig. 6.
Fig. 9 is an enlarged detail of the handle of lever in Fig. 5.
Fig. 10 is a sectional elevation on line 10, 10 of Fig. 1 on a much larger scale.
Fig. 11 is a half sectional elevation on line 11, 11 of Fig. 1 on a much larger scale.
Fig. 12 is an enlarged detail of part of Fig. 11.
Fig. 13 is a sectional plan view of assembling means No. 2.
Fig. 14 is an end elevation of one half of Fig. 13 on a larger scale.
Fig. 15 is a sectional plan view on line 15, 15 of Fig. 12 on a larger scale.
Fig. 16 is a sectional elevation on line 16, 16 of Fig. 15.
Fig. 17 is a sectional elevation on line 17, 17 of Fig. 14.
Fig. 18 is a sectional elevation on line 18, 18 of Fig. 15.
Fig. 19 is a sectional elevation on line 19, 19 of Fig. 17 on a larger scale.
Fig. 20 is the same as Fig. 14 with the parts shown in a different position.
Fig. 21 is a sectional elevation on line 21, 21 of the central part of Fig. 13 on a larger scale.
Fig. 22 is a plan view of Fig. 14 partly in section.
Fig. 23 is an elevation of Fig. 22 partly in section.
Fig. 24 is a part sectional elevation on line 24, 24 of Fig. 15.
Fig. 25 is a part sectional elevation on line of 25, 25 of Fig. 24.
Fig. 26 is a sectional plan view on line 26, 26 of part of Fig. 24.
Fig. 27 is the same as Fig. 26 with the part shown in a different position.
Fig. 28 is a sectional elevation on line 28, 28 of Fig. 15 on a larger scale.
Fig. 29 is a plan view of Fig. 28.
Fig. 30 is a sectional elevation on line 30, 30 of Fig. 29.
Fig. 30$^a$ is an enlarged sectional detail of part of Fig. 29.
Fig. 31 is an elevation of lifting means No. 1 over a hacking table.
Fig. 32 is a sectional elevation on line 32, 32 of Fig. 31 showing also cars for bricks.
Fig. 33 is an enlarged sectional view of the cars and turntables shown in Fig. 32.
Fig. 34 is a plan view partly in section of the turntable shown in Fig. 33.
Fig. 35 is a sectional plan view, the section taken on line 35, 35 of Fig. 32.

Fig. 38 is an elevation partly in section on line 38, 38 of Fig. 36.

Fig. 39 is a sectional elevation on line 39, 39 of Fig. 36.

Fig. 52 shows details of brick gripping plates on a large scale.

Fig. 53 shows another form of gripping plates on a large scale.

Fig. 54 shows a special form of gripping plates and push down bars.

Fig. 55 shows plates in Fig. 54 moved together.

Fig. 56 shows a side view of the brick in Fig. 55.

The same numerals refer to the same or similar parts throughout the several views.

Figure 21:
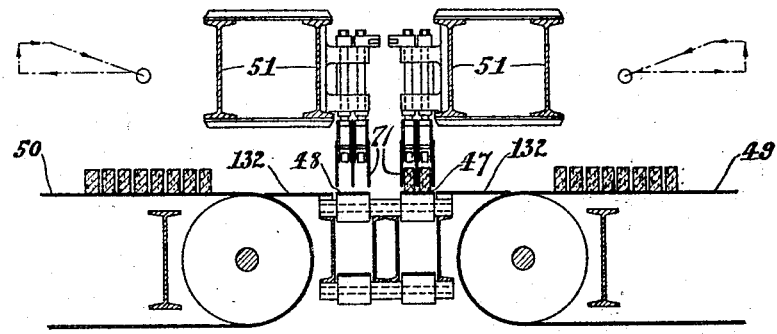

Assembling means No. 1.

The general arrangement is shown in Figs. 1 and 2 and details in Figs. 3 to 12 inclusive.

In Figs. 1 and 2 the bricks are shown being delivered by the belt 2, which is the off-bearing belt of the brick machine, or a belt receiving the bricks from the off-bearing belt.

Belt 2 delivers the bricks onto the wide intermediate belt 3, which in turn delivers the bricks onto either of the two receiving belts 4 and 5, which are more clearly shown in cross-section in Figs. 10 and 11. The belt conveyors 2 and 3 are driven respectively by the motors 6 and 7, and the belts 4 and 5 are driven by the motor 8, through the double-cone friction clutch 9, operated by the solenoid 10 controlled by the lever 10ª.

All these belts 2, 3, 4 and 5 are of course mounted on pulleys and supported on rollers as is usual.

While on belts 2, 3, 4 and 5 the bricks are confined sidewise by guide plates 11, which extend over belts 4 and 5 up to the transfer plates 12, shown in Figs. 10 and 11.

Between guide plates 11 over belt 2 and those over belt 3 is a switching means adapted to direct the stream of bricks to either belt 4 or belt 5.

Switching means No. 1.

This switching element referred to herein as switching means No. 1 is shown clearly on a larger scale in Figs. 3, 4 and 5, and consists of guide plates 13 supported pivotally from above and arranged to be moved by the hand lever 14.

Over guide plates 11 above belt 2 is suspended a stop bar 15, which is confined against longitudinal motion by links 16 and held up by solenoid 17, the current to which is controlled by a contact switch on the handle of lever 14 shown in larger scale in Fig. 9.

Stop bar 15 is above the top of the moving bricks when held up by the solenoid 17 as shown in Fig. 3, but when the switch on the handle of lever 14 is closed, stop bar 15 drops down on top of the moving bricks and stops all brick from passing beyond it. Bar 15 is of course narrower than the space between the ends of the bricks and therefore drops into the first space that comes along, and the following bricks abut against it and stop.

The long wide belts 18 and 19 are the hacking tables onto which the long rows of bricks are moved from receiving belts 4 and 5 by transfer plates 12, carried by sprocket chains 20 shown in Figs. 10 and 11.

Transfer plates 12 extend the full length of the rows of bricks to be assembled and serve to guide the bricks sidewise when they flow onto receiving belts 4 and 5, across the ends of which there is a bar 12ª, which stops the foremost brick of each row assembled.

Chains 20 are carried on sprocket wheels 21 and 22, mounted on suitably supported shafts as shown.

The shafts 23 carry large sprocket wheels 22 and also ratchet wheels 24, which are rotated by pawls 25 on the lever 26 moved by rods 27 attached to the piston in cylinder 28, which is operated by fluid pressure.

Referring to Fig. 10, a motion of rods 27 to left rotates shaft 23 and moves plates 12 to the right, and with them the rows of brick on receiving belt 5, which are thus slid over onto hacking table 19.

When rods 27 are moved to the left the transfer plates 12ª are not moved because the ratchet wheels 24 are right and left hand as shown, and accordingly this left hand motion simply moves lever 26 and its pawl 25 idly to the left.

After the completion of a stroke of rod 27 to the left, a stroke to the right of course moves the plates 12ª but leaves plates 12 at rest.

The motions of rods 27 by the plunger in the cylinder 28 are controlled by an operating lever moving a valve in the usual way as shown in Fig. 1.

Fig. 12 shows on a large scale a detail of means for keeping chains 20 from sagging, thus permitting plates 12 and 12ª to run close to the hacking tables 18 and 19.

When hacking belts 19 or 18 receive a full charge of rows of bricks, which for purpose of illustration is shown in the drawings as eighteen (18), these belts are moved lengthwise and the eighteen rows of bricks assembled on them are carried out from under chains 20 and their supports, and are brought to rest clear of all overhead parts as shown in Fig. 1.

Means for moving the hacking table belts 18 and 19 lengthwise are shown in Figs. 6, 7 and 8.

In Fig. 6 a part of hacking table belt 19 is shown on a part of its driving pulley 29 mounted on shaft 30, to one end of which is fastened spur gear 31 meshing with another gear 32 keyed fast to shaft 33. Free to revolve on shaft 33 is a disc 37 with a long hub on which is secured spur gear 35.

Disc 37 carries pawl 34 engaging with ratchet teeth 36 formed on gear 32. Gear 35 meshes with rack 38 formed on plunger 39 mounted in a suitable fluid pressure cylinder 40.

A motion of plunger 39 accordingly rotates pinion 35 and with it disc 37 and its pawl 34, and when the rotation is in the direction which engages pawl 34 with ratchet teeth 36, gear 32 rotates the same as gear 35, and gear 32 in turn rotates gear 31 and with it pulley 29 which moves the hacking table belt 19.

Accordingly when the plunger 39 is moved to the right into the position in which it is shown in Fig. 7, belt 19 is also moved in the same direction, but the belt moves a much greater distance than the plunger because the gear 35 is much smaller than gear 32, and gear 32 is larger than gear 31, and pulley 29 is larger than gear 31.

When plunger 39 is moved to the left from the position in which it is shown in Fig. 7, the belt 19 is not moved at all because the pawl 34 does not engage the ratchet teeth 36, as the pawl then moves in the direction in which the ratchet teeth point.

As shown in Fig. 1, there are two cylinders 40, one for moving hacking belt 18 and one for moving hacking belt 19.

The admission of fluid pressure to these cylinders 40 is controlled in the usual way by valves 41, which valves are moved by solenoids 42ª.

Having for example shown in the drawing means for assembling eighteen rows of brick on the hacking table and means for assembling same two rows at a time, it is evident that hacking table belts 18 and 19 must be moved lengthwise after each belt has received nine (9) charges from receiving belts 4 or 5 respectively.

To move the hacking belts automatically at proper times, ratchet wheels 24 have nine teeth and sprocket wheels 22 are so proportioned that one ninth of a turn moves the transfer plates 12 and 12ª the correct distance necessary to move two rows of bricks from receiving belts 4 and 5 onto hacking table belts 18 and 19, and stop with a set of transfer plates properly spaced over the receiving belts as shown in Fig. 10.

Ratchet wheels 24 carry pins 41 adapted to make electric contacts with stationary contacts 42 in an electric circuit connected with solenoids 42ª and this contact is made just as each hacking table belt receives its full charge of eighteen rows of bricks. One of the hacking belts of course receives its full charge before the other, and accordingly pin 41 on one side of the machine is set relatively one ninth of a turn ahead of the pin on the other side of the machine as shown in Fig. 10.

Having now described in detail assembling means No. 1 illustrated in Figs. 1 to 12 inclusive, a description of the operation of same will give a clear idea of this invention.

Referring to Fig. 1 and assuming that all motors are running and that bricks are flowing in on belt 2, the operator allows the bricks to flow onto receiving belt 5 until he thinks that a sufficient number of bricks have passed stop bar 15 to form rows of the length of transfer plates 12, and then he grips lever 14 and by so doing causes solenoid 17 to drop stop 15, which immediately stops the further flow of bricks past it. As soon as switch bars 13 are clear of bricks, the operator throws lever 14 and releases his grip on it, thus allowing solenoid 17 to lift stop bar 15 and permit bricks to flow on to receiving belt 4.

Then as soon as the bricks moving toward receiving belt 5 have abutted end to end with the foremost brick of each row against bar 12ª, the operator moves lever 10ª and throws clutch 9 by solenoid 10, thus stopping belt 5 and starting belt 4.

Then lever 28ª is thrown and the charge of bricks on belt 5 is moved over onto hacking table 19.

A repetition of these lever motions delivers two rows of brick onto hacking table 18.

If the operator allows a greater number of bricks to flow past the stop bar 15 than are required for the length of the rows to be assembled on the hacking belts, no trouble results, as such surplus bricks are on the receiving belt when it stops and remain there until the receiving belt is again started up, when they move forward and serve to form part of the next rows of bricks assembled on that receiving belt.

For the express purpose of permitting the operator to pass such surplus bricks, receiving belts 4 and 5 are made appreciably longer than the rows of bricks to be assembled, and accordingly stop bar 15 need not be dropped with great precision as the admission of too few bricks to form a row would not cause trouble.

After nine charges of two rows each have been assembled on hacking table belt 19, the charge is automatically moved forward and from under plates 12 by the automatic operation of its cylinder 40 as previously explained.

The speeds of the belts 2, 3, 4 and 5 are adjusted so that belts 4 and 5 will be filled with bricks all abutted end to end with a minimum sliding of the belts under the bricks, and belts 2, 3, 4, 5, 18 and 19 are usually made of steel to reduce wear and friction.

It is well known that bricks delivered by the off-bearing belts of brick machines are not spaced equal distances apart end to end, and that due to throwing off defective bricks or a stoppage of the brick machine there may be very wide gaps between the bricks, and therefore I call particular attention to the fact that the operation of this hacking machine is not in any way dependent on its receiving brick uniformly spaced end to end.

Assembling means No. 2.

Figure 42:
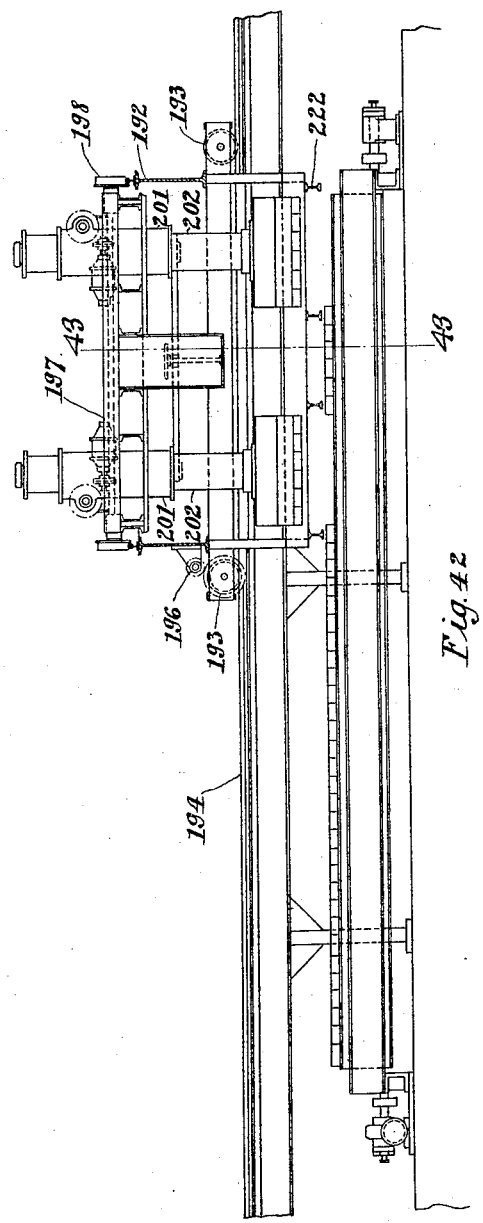
Fig. 42 is a general side elevation view of lifting means No. 2 shown over assembly means No. 1 (Figs. 1 and 2).
Figure 43:
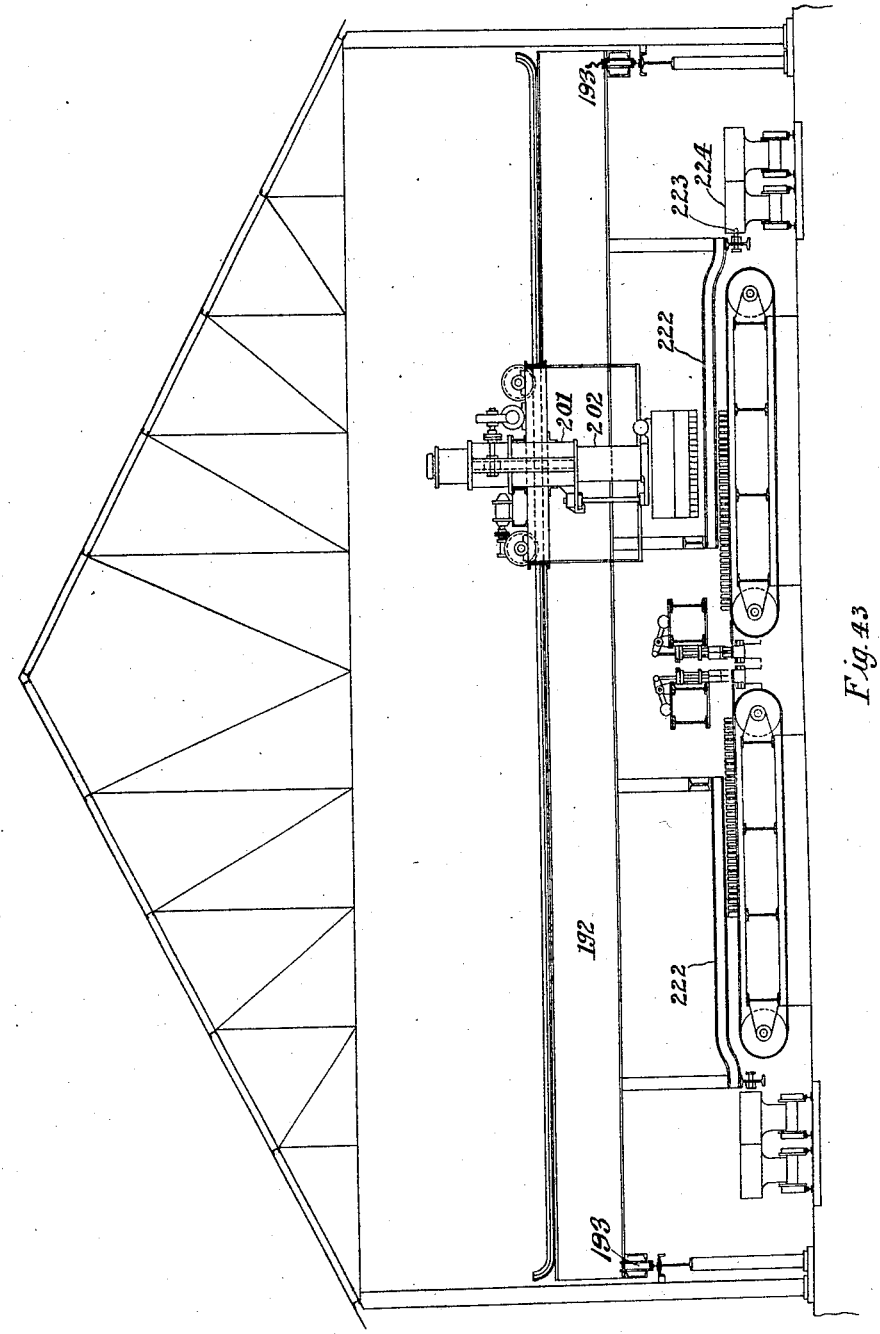
Fig. 43 is a sectional elevation on line 43, 43 of Fig. 42 showing assembly means No. 2 and cars for bricks.

The general arrangement is shown in Fig. 13 and the details in Figs. 14 to 30ª inclusive. A general cross-section is shown in Fig. 43 in connection with lifting means No. 2, and a general side elevation is shown in Fig. 42.

In Fig. 13 bricks are shown being delivered by the belt 43, which is the off-bearing belt of the brick machine, or a belt receiving bricks from the off-bearing belt.

Belt 43 delivers the bricks onto the wide intermediate belt 44, which in turn delivers the bricks onto either of two receiving belts 47 and 48, which belts are clearly shown in cross section in Fig. 21.

Referring to Fig. 21, the operation will best be understood by noting right here that in this case the hacking table belts 49 and 50 move at right angles to the receiving belts 47 and 48, and that by means hereinafter described the bricks are lifted from belts 47 and 48 and deposited on belts 49 and 50, and that these latter belts are moved step by step after each lot of bricks is deposited on them.

The following description refers to but one end of one of the brick lifting means, as the end of both of the lifting means are practically the same.

The lifting means consists of a substantial but relatively light frame shown as consisting of two I-beams 51 attached to end pieces 52 supported by links 53 and 54 carried by bell crank levers 55 and 56, which levers are connected together by rod 57.

Bell crank lever 56 has an extension carrying a counterweight 57ª, which slightly overbalances the weight of the frame and its attached parts supported by the rods 53 and 54.

The end pieces 52 have plane surfaces bearing against bracket bars 58 see Fig. 17 attached to substantial housings 59, on which the bell crank levers 55 and 56 are pivoted.

The lifting frames consisting of the I-beams 51 and attached parts, being supported by the rods 53 and 54 and held endwise by the bracket bars 58, are free to be moved horizontally and vertically but not lengthwise.

Referring to Fig. 21, to transfer the bricks from belt 47 to belt 49 it is clear that the bricks should first be lifted up clear of belt 47, say ½", and then moved sidewise over belt 49 and deposited thereon, and further after the bricks have been released by the gripping plates the entire lifting frame must be raised vertically to bring the gripping plates clear of the bricks, so that they may be returned to their initial position over belt 47 without disturbing the bricks deposited on belt 49.

Briefly, it is necessary that the lifting frames shall be moved through paths about as indicated by the arrows in the diagrams above Fig. 21, and this is readily accomplished by guiding the end pieces 52 by pins 60 confined in frames 61, clearly shown in Fig. 19, and moving the frames back and forth sidewise by links 61ª, see Fig. 20, operated through lever 62 and links 63 by the cranks 64 described later herein.

Here it should be noted that while the counterweight 57ª tends to move the frame and the pin 60 upward when bricks are not being carried on account of the weight of the bricks there is no upward lifting tendency of pin 60 when brick are being carried.

Accordingly, when moved to the left from the position shown in Fig. 19, pin 60 rides along on the lower surface of guide frame 61, which causes it to rise quickly about one-half inch ($\frac{1}{2}''$) at the start and then to move along in a straight horizontal line.

When pin 60 reaches its extreme left hand position in Fig. 19 the bricks are automatically deposited on the hacking belts, as hereinafter described, and the removing of the weight of the bricks from the lifting frame causes the frame and of course the pin 60 to be moved up vertically by the counterweight 57$^a$.

When the lifting frame is then moved to the right, in Fig. 19, pin 60 is above latch 65 and is guided by the upper part of frame 61 down into its extreme right hand position in which it is shown. During this motion to the right, pin 60 presses down latch 65, which is pivoted in frame 61 and is held up into the position shown simply by counterbalance 66$^a$.

Referring to Figs. 14 and 15, the crank 64 is fast on shaft 66, on which is also fast gear 67 meshing with rack 68 formed on the plunger 70 in cylinder 69.

The gear 67 and rack 68 are so proportioned that one complete stroke of plunger 70 rotates shaft 66 through one hundred and eighty degrees (180°), and accordingly crank 64 moves from dead center to dead center in moving the lifting frame back and forth horizontally, and thus insures an accurate and easy motion for the lifting frame and all attached parts.

Shafts 66 extend the entire length of the machine and, as shown in Fig. 13, have cranks 64 at each end, which keep the lifting I-beams 51 always parallel with these shafts.

Referring to Figs. 22 to 27 inclusive, the bricks are lifted from the assembly belts by gripping plates 71 attached to bars 72 attached by pin connections 73 to levers 74 on vertical shafts 75, carried by brackets 76 attached to I-beams 51. Shafts 75 are in pairs and all are coupled together by links 76 connecting levers 77 and 78 which are fast on their upper ends.

Levers 78 are connected together by rods 79 connected with a double bell crank lever 80 pivoted in a bracket extension on piece 52, and acccordingly a motion of bell crank lever 80 causes all the several pairs of shafts 75 to rotate, and a slight rotation of shafts 75 moves bars 72 together and causes the plates 71 to grip the sides of the brick as indicated in Fig. 27.

Attached to one or more of levers 77 are rods 81, which pass through the I-beams 51 and are fitted with nuts and washers bearing on springs 82, which are always compressed and thus tend to cause shafts 75 to rotate and bring plates 71 together as shown in Fig. 27.

Figure 22:
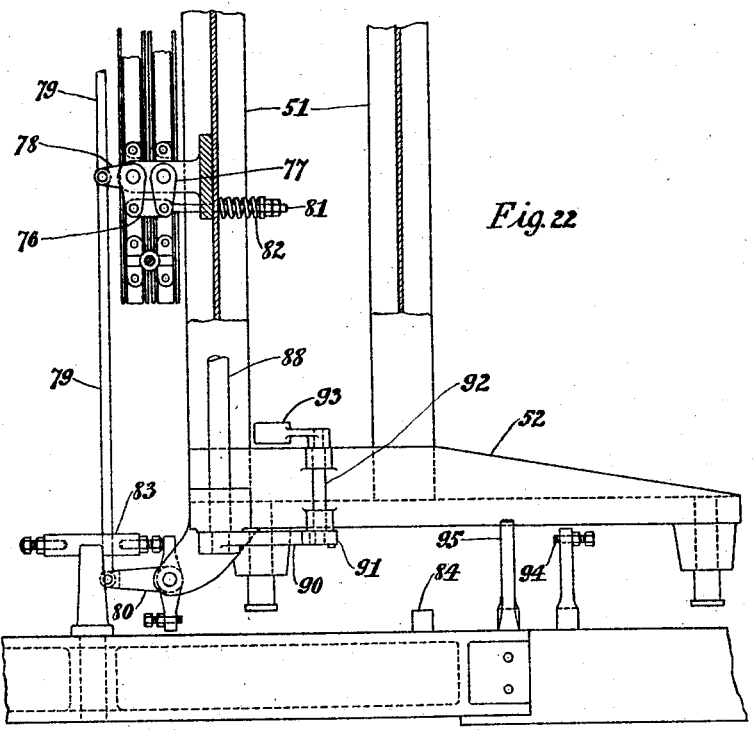

The rotation of shafts 75 by the pressure of springs 82 is resisted by double bell crank lever 80, to which rods 79 couple all of shafts 75 through levers 77 and 78 as shown in Fig. 22.

Figure 23:
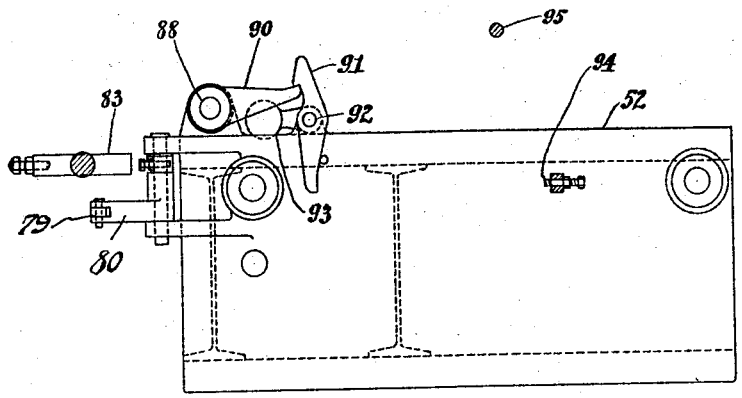

When the lifting frame is in its extreme left hand position as shown in Figs. 22, 23 and 24, one end of double bell crank lever 80 is in contact with a stationary stop 83, which resists its tendency to rotate caused by the push on rods 79 due to springs 82, and thus plates 71 are held apart as shown in Figs. 24 and 26.

Accordingly when the lifting frame is moved to the left from the position in which it is shown in Figs. 22 and 24, lever 80 is immediately moved away from stop 83 and springs 82 acting as described, force plates 71 to move together and grip the bricks, and likewise when the lifting frame is moved to the right the other arm of double bell crank lever 80 comes against stationary stop 84 and the bricks are released by gripping plates 71 just as they reach their extreme position to the left over hacking table belt 49.

If the bricks are soft or sticky they may adhere to the gripping plates 71, and to release the bricks from these gripping plates and more particularly to insure the bricks being deposited exactly central with the plates, push down bars 84 are used as shown in Figs. 24 and 25.

These bars are suspended between the plates 71 by yokes 85 and rods 86 attached to levers 87 mounted on shaft 88, supported by bearings 89 on I-beam 51.

The weight of the push down rods 84, yokes 85 and rods 86 is partly counterbalanced by the counterbalance extensions on levers 87, but at all times the weight of parts 84, 85 and 86 tends to rotate shaft 88.

Referring to Figs. 22 and 23, fast on one end of shaft 88 is lever 90, engaging with latch 91, which thus holds shaft 88 from rotating and keeps the push down bars 84 up and away from the bricks as shown in Figs. 24 and 25.

Latch 91 is mounted on end piece 52 on shaft 92, attached to which is counterweight lever 93, which tends to force latch 91 against the end of lever 90.

When the lifting frame is moved to the right from the position in which it is shown in Figs. 22 and 23, the lower end of latch 91 is moved toward stationary stop 94, which it encounters just before the motion to the right is completed.

When the lower end of latch 91 comes against stop 94, the upper end of latch 91 is moved away from lever 90, which on being released allows shaft 88 to rotate slightly and the push down bars 84 move down on top of the bricks.

The stationary stop 94 is located and adjusted so that push down bars 84 come down on top of the bricks just before they are released by the plates 71, and accordingly, as the grip of plates 71 lessens, the bars force the brick down and the brick are deposited exactly central between plates 71 and thus accurately located on the hacking table belts 49 or 50.

Figure 20:
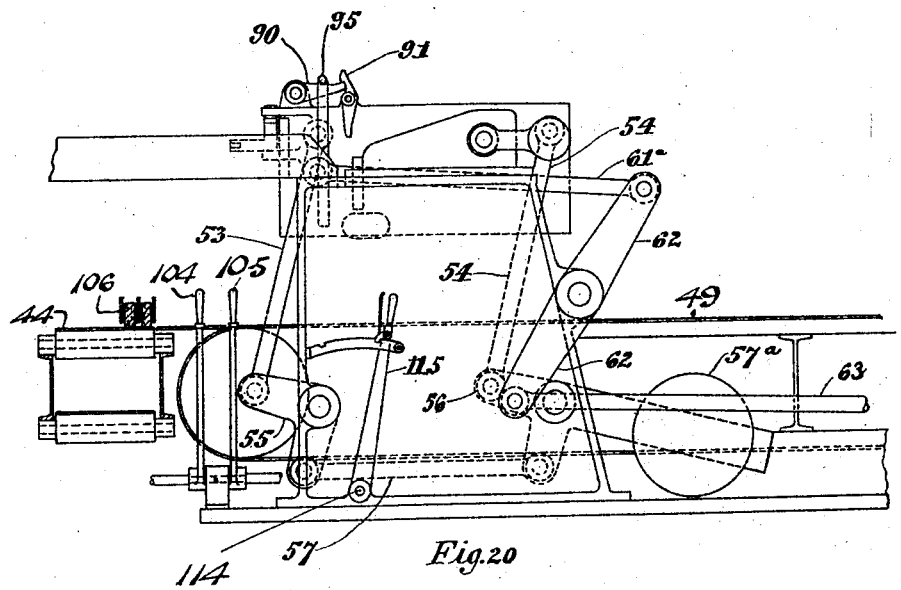

After reaching its extreme right hand position the lifting frame moves up vertically, as explained above in connection with Figs. 19 and 21, into the position shown in Fig. 20, and during this upward movement lever 90 comes in contact with stationary stop 95 and, its end being held by stop 95, it is moved back into the position shown in Figs. 20 and 23 and is automatically caught by the latch 91.

After each lot of bricks is deposited onto a hacking table belt it is of course necessary that the belt be moved to make room for the succeeding charge, and on referring to Figs. 14 and 15 it will be seen that the following means serve to give the hacking table belts these necessary intermittent motions.

Shaft 66 carries an eccentric 96 with strap and rod 97 connected to levers 98 mounted loose on shaft 99, to which is fast ratchet wheel 100 moved by pawl 101 attached to levers 98.

When shaft 66 is rotated, eccentric 96 moves rod 97, which turns lever 98 around shaft 99, and pawl 101 engages with and turns ratchet wheel 100 and with it shaft 99, on which is mounted pulleys 102 carrying belt 49.

These parts are so proportioned that when shaft 66 is turned 180°, pulleys 102 rotate through the exact angle necessary to move belt 49 an amount exactly equal to twice the distance center to center of the rows of bricks deposited on belt 49.

Eccentric 96 is so located on shaft 66 that pawl 101 rotates shaft 99 and moves belt 49 after the brick lifting plates 71 have deposited the bricks on belt 49 and are being moved back toward the receiving belt.

From the foregoing it will be seen, on referring to Figs. 14, 15 and 21, that a movement to the right of plunger 70 causes the bricks to be lifted from receiving belt 47 and deposited on hacking belt 49, and that a reverse motion of plunger 70 moves the brick lifting means back to its initial position and at the same time moves belt 49 and the bricks on it an exact distance to the right.

In that push down bars 84 cause the rows of bricks to be accurately located when deposited on the hacking table belts and these belts are moved the exact desired center to center distance after each lot of bricks is deposited, it is evident that all of the rows of bricks assembled on a hacking table will be accurately spaced the same distance center to center, and of course parallel with each other.

Referring to Figs. 14 and 15, the movements of plunger 70 are controlled by four-way valve 103 operated by lever 104, and lever 105 controls the valve for cylinder 69 on the other side as shown in Fig. 13.

*Switching means No. 2.*

Figs. 16, 17, 18, 28, 29, and 30 show switching means No. 2 for assembling rows of abutted bricks on receiving belts 47 and 48.

Flexible guide plates 106 and 107 serve to guide the bricks on the wide intermediate belt 44 on to either receiving belt 47 or 48, shown in Fig. 13.

One end of guide plates 106 and 107 is in line with the guides over belt 43, and the other end is attached to movable carriers.

Referring to Figs. 28, 29 and 30, stationary stands 108 support round bar 109 carrying a long sleeve 110, which is free to move lengthwise of bar 109 but is held against rotating by feather 111. Sleeve 110 has rigidly attached to it the free end of guide plate 107 and is connected by rod 112 with lever 113 on shaft 114, controlled by the switch operating lever 115 shown in Figs. 13, 16, 17 and 20.

The free ends of guide plates 106 are rigidly attached to sleeves 116 mounted slidably on sleeve 110, on which are also mounted springs 117 bearing against collars 118.

Sleeves 116 are connected by links 119 with lever 120 pivoted on the central part of sleeve 110.

Springs 117 are always compressed and always tend to push sleeves 116 together, and through links 119 tend to rotate lever 120, which is shown in Fig. 29 as held against turning by contact with fixed stop 121 attached to stationary stand 108.

In Figs. 28 and 29 sleeve 110 is held in the position shown by rod 112 attached to operating lever 115, which is held by its latch as shown in Figs. 14 and 20, and stop 121 holds lever 120 and through links 119 also holds sleeves 116 sufficiently apart to permit bricks to pass freely between guide plates 106 and 107 as shown.

When sleeve 110 is moved to the left from the position in which it is shown in Figs. 28 and 29, lever 120 moves away from stop 121 and springs 117 force sleeves 116 and attached guide plates 106 together, and thus the bricks are at once gripped by the ends of guide plates 106 during the initial left hand movement of rod 112.

With bricks gripped between plates 106 the motion continues to the left, and just before the extreme left hand position is reached the other end of lever 120 encounters fixed stop 122 and the completion of the motion to the left causes lever 120 to be slightly turned by stop 122 and this turning of lever 120 forces sleeves 116 and attached guide plates 106 apart and releases the bricks.

The full movement of sleeve 110 and attached guide plate 107 is equal to the distance center to center of receiving belts 47 and 48, and accordingly, when at rest guides 106 and 107 are in line with lifting plates 71 when same are in place over belts 47 and 48.

From the above it will be seen that the ends of guide plates 106 and 107 are held apart by stop 121 and permit bricks to pass freely between them when in their extreme right hand position in Fig. 28, and also by stop 122 when in their extreme left hand position, and that when moving from one position to the other, plates 106 are forced together by springs 117 and hold the bricks gripped between them, and plate 107.

Referring to Fig. 13, receiving belts 47 and 48 are driven by motor 123 through a double friction clutch 124 operated by solenoid 125, which is controlled by the motion of the switch above described as follows:

One of collars 118 carries an insulated electric contact piece 126, which engages alternately with an electric contact collar 127 on the collared end insulated sleeve 128 mounted free to slide on stop bar 122, as shown in Fig. 30ª.

Pieces 126 and 127 are in the electric circuit with solenoid 125, and when in contact as shown in Fig. 30ª solenoid 125 holds friction clutch 124 so that receiving belt 47 is driven by motor 123. When contact between pieces 126 and 127 is broken, solenoid 125 throws clutch 124 and stops belt 47 and starts belt 48.

Thus when the switch is in its right hand position as shown in Figs. 13 and 29, pieces 126 and 127 are in contact and belt 47 is running and the initial motion to the left of the switch breaks the contact between pieces 126 and 127, and thus causes solenoid 125 to throw clutch 124 and stops belt 47 and starts belt 48.

Referring to Fig. 30ª as piece 126 continues to move to the left it engages with and carries sleeve 128 with it, so that when the motion of piece 126 is reversed, its initial motion to the right brings it quickly into contact with piece 127. Thus clutch 124 is thrown by solenoid 125 by the initial motion of the switch from either its right or left hand positions.

Referring to Fig. 13, belt 43 is driven by motor 129 and belt 44 by motor 131.

The speeds of belts 43, 44, 47 and 48 are so adjusted that belts 47 and 48 will be filled with brick all abutted end to end with a minimum sliding of the belts under the bricks.

Belts 43, 44, 47 and 48 are usually made of steel to reduce wear and friction, and are mounted on the usual pulleys and supporting rollers.

Hacking table belts 49 and 50 are mounted on numerous pulleys 102 on shafts 99 and are preferably made of steel.

On account of the great width of belts 49 and 50, shafts 99 are usually supported by bearings through their length, and in dotted lines in Fig. 13 six pulleys 102 are shown on each shaft with gaps between for shaft bearings.

Continuous pulley surfaces are of course not necessary for these wide belts 49 and 50, as they are sufficiently rigid to readily span gaps between pulleys, such as the gaps for shaft bearings.

To insure good level surfaces for the bricks, the upper runs of the hacking table belts are supported on a number of cross bars 129 shown in Fig. 16.

Referring to Fig. 13, stop bar 130, which is close to belts 47 and 48 and adjustable lengthwise of same, is so located that when either belt 47 or 48 is filled with bricks abutting against bar 130, the desired number of bricks are assembled abutted end to end with the other end of each row just clear of the moving ends of switch plates 106 and 107, Fig. 29.

In all the equipment herein described, when passing from one belt to another, the bricks are supported by the usual smooth sliding plates, such as plates 131 and 132, Figs. 16 and 18.

With the above description of details the operation of assembling means No. 2 can now be readily followed.

Referring to Fig. 13 and assuming that all motors are running and that bricks are flowing along belt 43, bricks are allowed to pass over belt 44 onto belt 47 until it is filled with bricks abutted end to end with the foremost bricks against stop bar 130, and then the operator throws switch lever 115 and diverts the flow of bricks onto belt 48, and then immediately throws lever 104 and admits fluid pressure into cylinder 69, thereby, causing plunger 70 to move the entire lifting means from the position shown in Fig. 14 to the position in Fig. 15, which motion causes the bricks to be lifted from belt 47 and deposited on hacking table belt 49 as explained above.

As soon as the bricks are deposited on belt 49, the operator reverses lever 104 and the lifting means are returned to their initial position, and hacking table belt 49 carries the brick just received one step away as previously described.

Then, when belt 48 has received its charge of bricks, the operator reverses switch lever 115 and later moves and reverses valve operating lever 105, and in like manner the bricks are lifted from belt 48 and deposited on the hacking table 50 adjacent to it.

Repeated movements of levers 115, 104 and 105 as above fill the hacking tables with numerous rows of bricks all accurately spaced as indicated in Fig. 13, and these assembled rows of bricks are at convenient intervals lifted from the hacking tables and placed on to cars as described hereinafter.

Both of the assembling means herein described provide for guiding the bricks sidewise from the time they are received from the brick machine until they are brought to rest in long rows on the receiving belts, and this side guiding of the bricks I shall claim as I consider it essential for successful assembling of bricks in long parallel rows.

For switching means No. 1 transfer plates 12 and 12ª, Figs. 10 and 11, serve to guide the rows of bricks sidewise while passing onto the receiving belts, and for switching means No. 2 lifting plates 71, Fig. 24, serve as guides over the receiving belts, and I regard such guiding of the bricks over the receiving belts as most important.

In that the bricks are supplied from the brick machine in a continuous moving stream or streams, it is clearly necessary that either their motion or direction of motion must be changed to permit of bringing any bricks to rest out of the way of the following bricks; and as the switching means herein illustrated and described provides for stopping the flow of bricks for an interval sufficient to permit of changing their direction of flow, and this is believed to be new, I shall claim same broadly as a very important part of my invention. Referring to switching means No. 2, Figs. 13, 15, 28 and 29, and noting that the switch is not thrown until the bricks are backed up abutted end to end from stop bar 130 to switch plates 106 and 107, it will be seen that when the flow of bricks is stopped, the bricks gripped by plates 106 and 107 are abutting against the bricks on the receiving belt, and that therefore when the switch is thrown the ends of the bricks gripped by it are moved sidewise in contact with the ends of the bricks on the receiving belt. To prevent the spalling or distortion of the ends of the bricks when moved by the switch in contact with the bricks on the receiving belt, the ends of gripping plates 71, which are then acting as guide plates, are carried up close to the ends of switch plates 106 and 107 as shown in Fig. 15, and plates 71 support the bricks at rest between them, so that when the switch is moved there can be no spalling or distorting of the bricks between plates 71 or the bricks between plates 106 and 107.

In switching means No. 1 when the operator allows surplus bricks to run onto the receiving belt, the bricks moved sidewise by plates 12 have their ends in contact with the ends of the surplus bricks, but in this case also no spawling or distorting can occur because the ends of guide plates 11, Fig. 1, extend up close to the ends of plates 12, Figs. 10 and 11, which plates are then serving as guide plates over the receiving belt.

This supporting of the bricks sidewise close up to their ends when moving them sidewise with their ends abutting, I regard as an important detail and shall claim same.

Lifting means No. 1 is shown in Figs. 31 to 39 inclusive.

Figure 31:
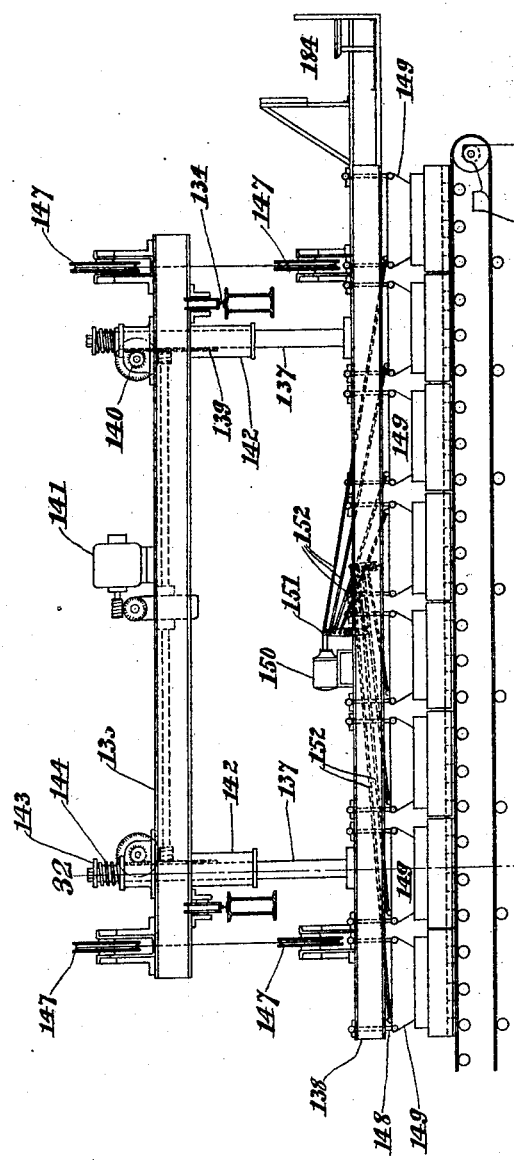
Figure 32:
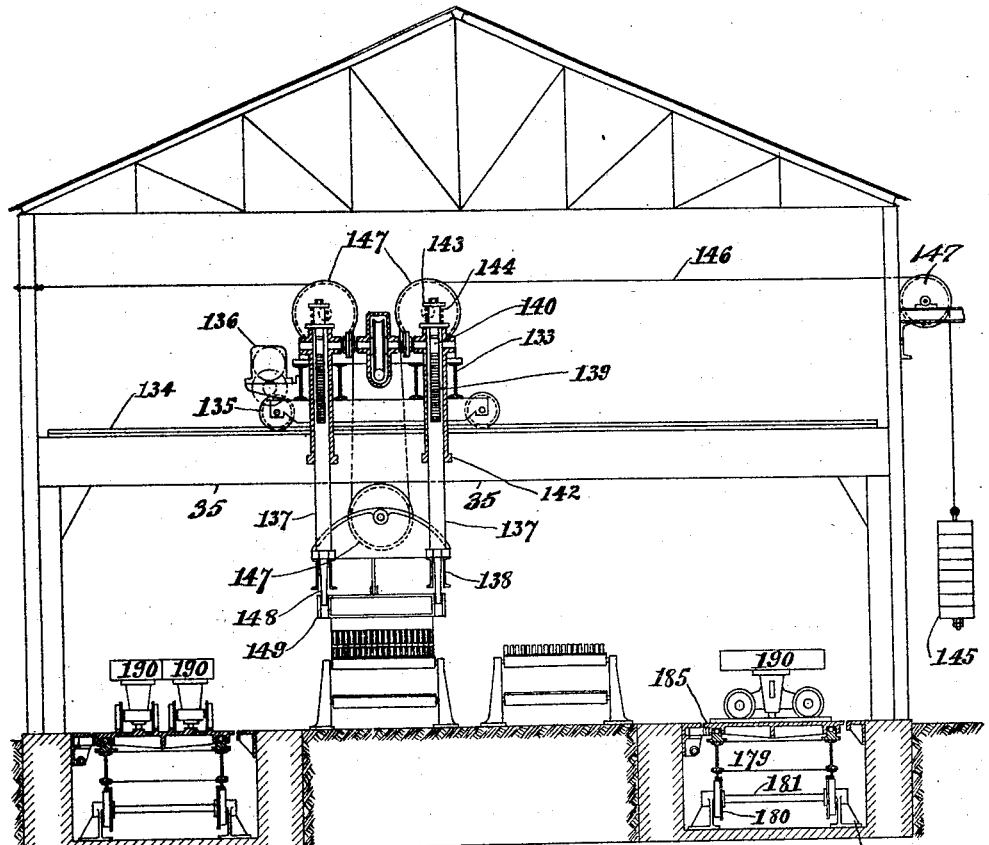
Figure 34:
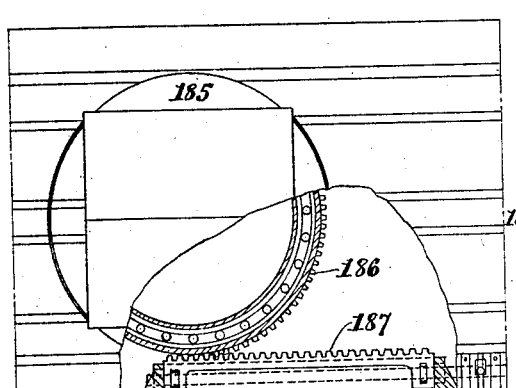
Figure 33:
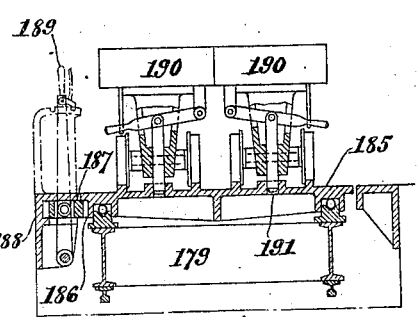
Figure 36:
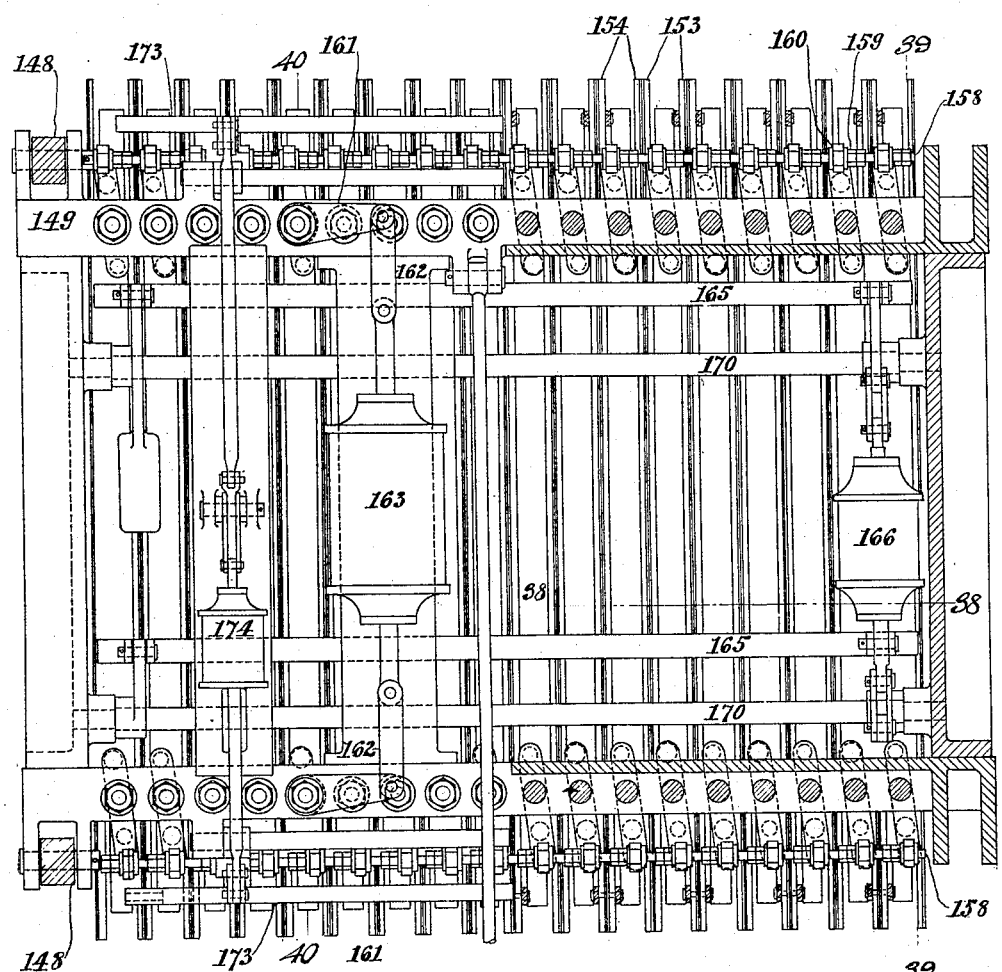
Fig. 36 is a plan view partly in section of one of the brick lifting units for lifting means No. 1 shown as a section on line 36, 36 of Fig. 38.
Figure 37:
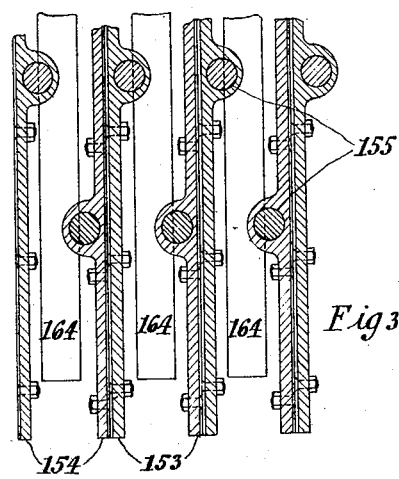
Fig. 37 is an enlarged detail of part of Fig. 39 shown as a section on line 37, 37.

As shown in Figs. 31 and 32, the brick lifting means are carried by an overhead traveling crane 133 carried on tracks 134 by wheels 135 driven by motor 136 through gearing in the usual manner.

Extending down from this crane are four bars 137, to the lower ends of which are attached a substantial frame of channels 138. Attached to bars 137 are racks 139 engaging with pinions 140 rotated by motor 141 through worms and worm wheel and other gearing as usual.

Bars 137 are slidably mounted in substantial guide brackets 142, and their upper ends are fitted with large washers 143 bearing on springs 144 resting on brackets 142.

When the bars 137 are in their lowest position they are supported by the springs 144, which serve to stop their further descent without shock.

Counterweights 145 attached to cables 146 passing over pulleys 147 nearly counterbalance the weight of frame 138 and attached parts, and thus reduce the load to be lifted by motor 141.

Suspended from frame 138 by links 148 are frames 149 carrying the brick gripping means shown in Figs. 36 to 41 inclusive.

Solenoid 150 acting through lever 151, in Fig. 31, and rods 152 serves to move the various frames 149 lengthwise of frame 138, and the parts are so proportioned that a stroke of solenoid 150 moves frames 149 equal distances apart.

The means shown for gripping the bricks are similar to those shown in Fig. 24 for assembling means No. 2, but for clearness different numbers are used for the like parts.

Referring to Figs. 36 to 41, gripping plates 153 are attached to bars 154 mounted on pins 155 extending down from levers 156 formed on vertical shafts 157 rotatably mounted in frame 149.

The ends of each lot of levers 156 are connected by rods 158 carrying adjusting nuts 159 bearing against the forked ends of pins 160.

One of each row of vertical shafts 157 is carried above frame 149 and fitted with levers 161 connected by links 162 with the plunger of solenoid 163, which thus serves to close and open gripping plates 153 as levers 161 move alike and cause all of vertical shafts 157 to turn alike.

Push down bars 164 attached to cluster rods 165 are operated by solenoid 166 through links 167 and 168 by bell cranks 169 on shaft 170 mounted in frame 149.

Figure 41:
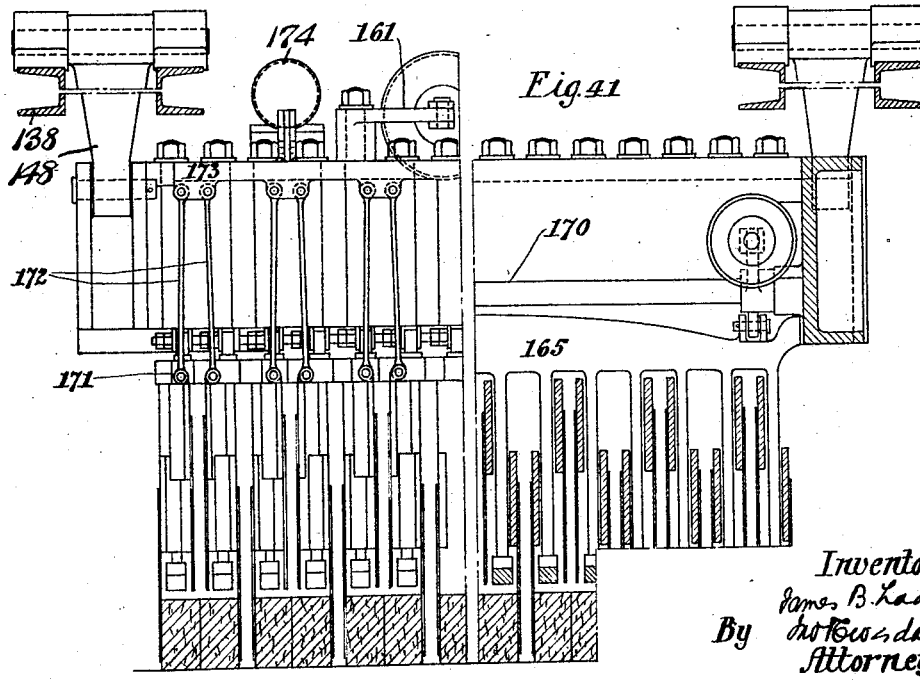
Fig. 41 is the same view of Fig. 38 with the parts in different positions.

To provide for lifting the rows of bricks in pairs as shown in Fig. 41, some of bars 154 have ears 171 connected by rods 172 with bars 173, which may be raised by solenoid 174 by means of bell crank levers 175, links 176 and 177 and lever 178.

Figure 40:
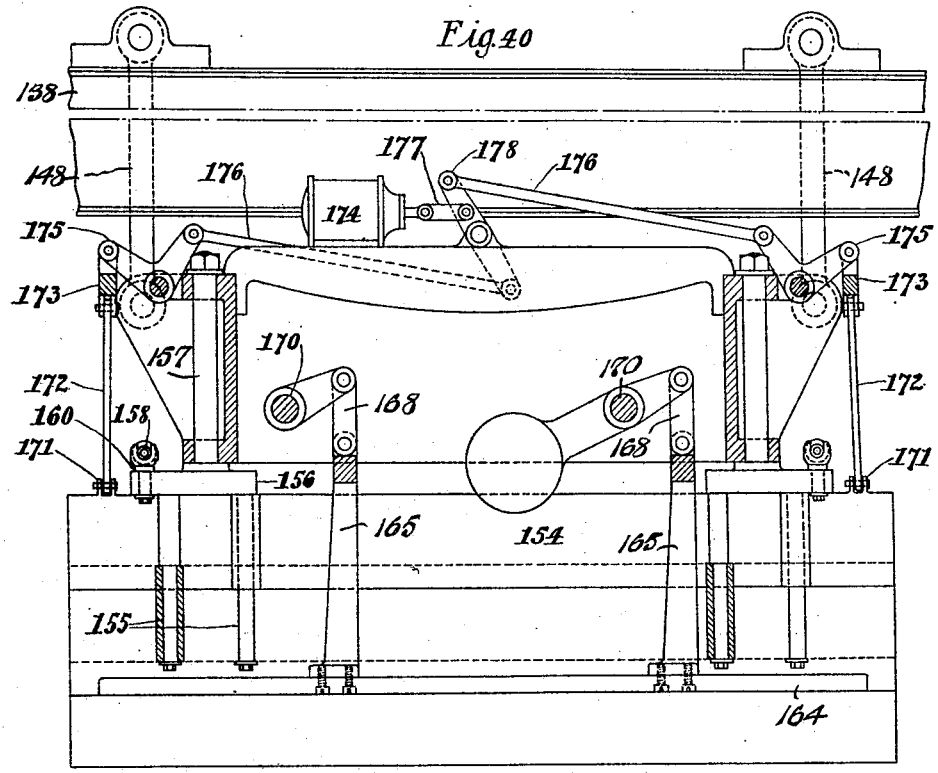
Fig. 40 is a sectional elevation on line 40, 40 of Fig. 36.

Those of bars 154 with ears 171 are free to slide up on pins 155, and accordingly when solenoid 174 is operated these bars are raised up from the positions shown in Figs. 38 and 39 to the positions in which they are shown in Figs. 40 and 41, and when so raised they and their attached gripping plates do not interfere with the movements of the other gripping plates as is clearly shown in Fig. 41.

As the operation of transferring the bricks to the cars by lifting means No. 1 described in detail above requires movement of the cars, description of same is given later herein.

*Car moving means.*

The car moving means is shown in Figs. 32, 33, 34 and 35 and consists of transfer tables 179 supported on several sets of wheels 180 mounted on axles 181 free to rotate in fixed bearings 182.

Transfer tables 179 may be moved longitudinally by fluid pressure cylinders 183 or the like, controlled by an operator in cage 184 built onto frame 138 carried by crane 133.

These transfer tables carry tracks for the cars and several turntables 185, shown for example as four.

Turntables 185 are fitted with spur gear teeth 186 adapted to mesh with racks 187 supported in stationary brackets 188.

Racks 187 are held against longitudinal motion by brackets 188, but may be moved toward or away from the turntables by hand levers 189.

If the transfer tables are moved longitudinally when racks 187 are in gear with teeth 186, the turntables 185 are necessarily rotated and gears 186 are so proportioned that the full longitudinal movement of transfer tables 179 causes the turntables to turn through exactly ninety degrees (90°).

If racks 187 are not in gear with teeth 186, the turntables are of course not rotated when the transfer tables are moved.

The drawings show, merely for example, the use of two rectangular bodied cars 190 placed side by side to form a square platform for the bricks.

To hold the cars secure on the turntables during rotation they are equipped with latches 191, or the like, engaging with turntables 185.

To illustrate the operation of this lifting means No. 1, I have shown same in Figs. 31, 32 and 35 in position for handling bricks assembled on a hacking table by assembling means No. 1.

Crane 133 is first accurately located over the hacking table with gripping plates 153 open as in Fig. 38 in line with the spaces between the rows of bricks, and then frame 138 is lowered until the gripping plates are close to the hacking table.

Solenoids 163 are then thrown and the bricks are gripped by plates 153.

Frame 138 is then raised the height of one brick by motor 141 and the crane is moved by motor 136 over a set of cars, taken for example as the cars shown on the upper part of Fig. 35, and during this movement solenoid 150 is thrown and the several suspended frames 149 are moved slightly apart, about $\frac{1}{2}''$, and the bricks are thus separated into square lots, each lot consisting of eighteen (18) rows of six (6) bricks per row in conformity with numbers shown for example in the drawings.

When the bricks are over the cars every other square lot is exactly over a car because the distance center to center of frames 149 when separated by solenoid 150 is exactly twice the distance center to center of turntables 185.

Push down bars 164 are then brought down on top of the squares of bricks over the cars by solenoids 166, and at the same time plates 153 holding these bricks are moved apart by solenoids 163 and the bricks are deposited on the cars accurately spaced and aligned.

In that the alternate squares of bricks are deposited in separate batches, it is of course understood that solenoids 166 and 163 are operated in lots of four.

After one course of bricks has thus been placed on the cars shown at the top of Fig. 35, frame 138 is raised the height of one brick by motor 150 and transfer table 179 is moved to the left and the cars are moved under the four squares of bricks remaining on frames 149.

If racks 187 are in mesh with the turntable gear 186 when transfer table 179 is moved as above, the cars are rotated 90° as they are moved and are brought into place exactly under the suspended squares of brick with the rows of bricks on them at right angles with the rows of bricks held above them.

If racks 187 are not in mesh with gear 186, the cars are of course not rotated and are brought into place with the rows of bricks in line with the run of brick held above them.

The four remaining squares of bricks are then deposited accurately on top of the first lot of squares by means of solenoids 163 and 166.

Frame 138 is then raised the height of a brick and the crane returned to its initial position over the bricks assembled on another hacking table, and these motions are repeated until one set of cars has received its full quota of bricks, when loading of another lot of cars is taken up and the loaded cars are replaced by empty ones while the second lot are being loaded.

Figure 57:
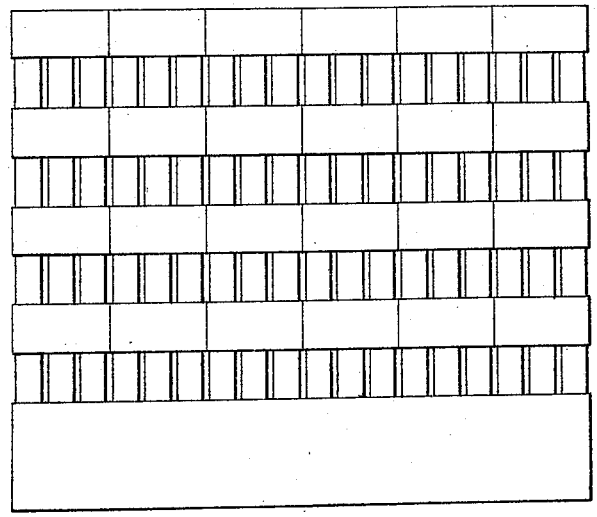
Fig. 57 shows the usual form of stack of bricks.

The above procedure stacks the bricks with alternate courses at right angles as shown in Fig. 57 if racks 187 are in mesh with gear 186 when transfer table 179 is moved.

Figure 58:
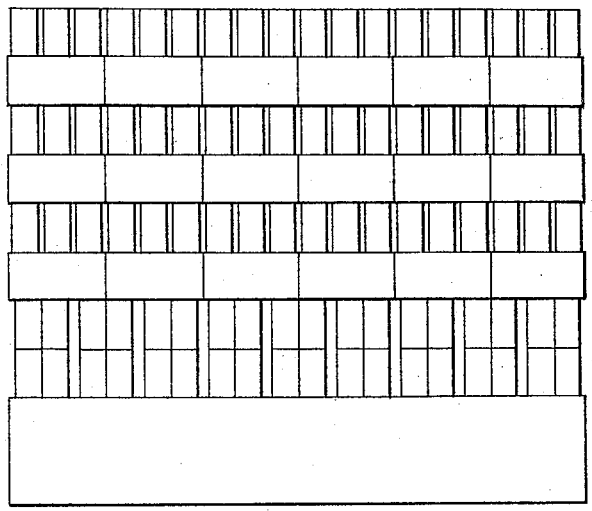
Fig. 58 shows a special form of stack of bricks.

To facilitate handling after drying it is sometimes desired that bricks be stacked on cars as shown in Fig. 58 with the first two courses of double rows in line over each other, and this form of stack is readily produced by handling the first two courses in double rows as shown in Fig. 41 and keeping racks 187 out of mesh with gear 186 while the cars are moved for receiving these two courses.

In like manner bricks may be stacked on the cars with courses of single or double rows of bricks in line or right angles with each other in all possible combinations.

Lifting means No. 2 shown in Figs. 42 to 51 inclusive differ from the above mainly in rotating the squares of bricks as they are moved from hacking tables to cars instead of rotating the cars, and in being carried on a traveling crane trolley instead of on the crane proper.

The traveling crane bridge 192 is mounted on wheels 193 supported by rails on the usual crane runway 194, and is driven by motor 195 through shaft 196 and gearing as usual.

Trolley 197 is mounted on wheels 198 supported by rails on the crane bridge 192. Wheels 193 are mounted on shafts 199 driven through worm gearing or the like by motor 200, Figs. 45 and 46.

Figure 47:
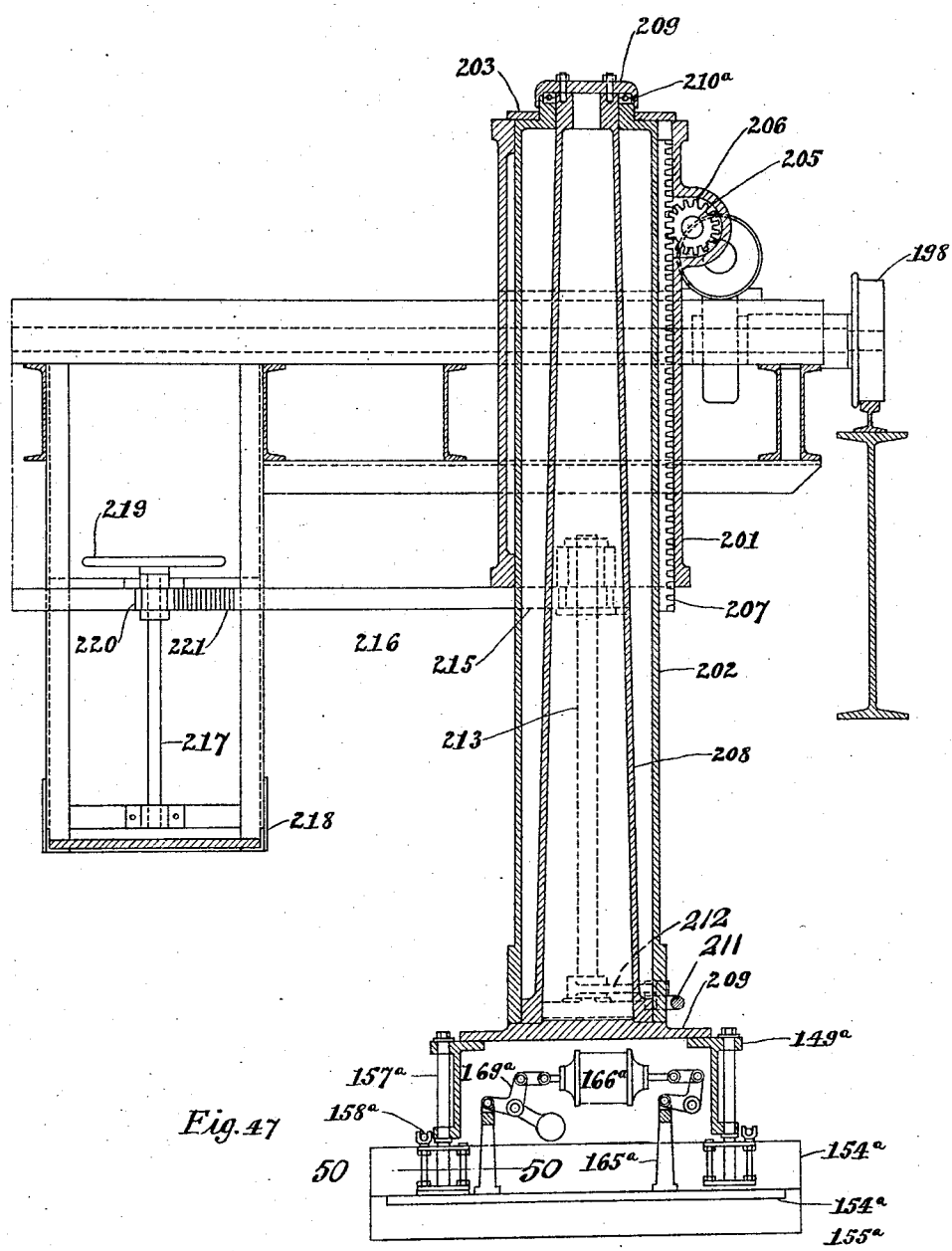
Fig. 47 is a part sectional elevation on line 47, 47 of Fig. 46.
Figure 48:
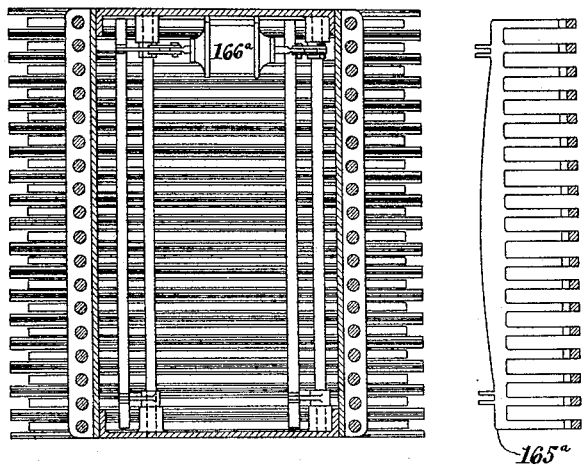
Fig. 48 is a sectional plan view on line 48, 48 of Fig. 45.

Mounted on trolley 197 are two substantial guide frames 201, within which are slidably mounted lifting cylinders 202 shown most clearly in Fig. 47.

Cylinders 202 pass entirely through guide frames 201, and in their lowest position, shown in Fig. 47, these cylinders are supported by attached rings 203, resting on the top of guide frames 201.

Motors 204, through suitable gearing drive shafts 205 supported in guide frames 201. Pinions 206 are keys to shafts 205 and mesh with racks 207 fastened to cylinders 202, which accordingly may be raised or lowered by motors 204.

Rotatably mounted within cylinders 202 are conical hollow shafts 208 with top flange 209 resting on ball bearings 210$^a$.

Figure 49:
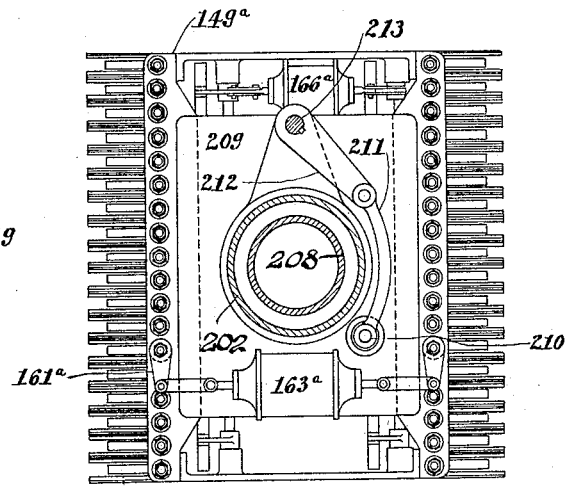
Fig. 49 is a sectional plan view on line 49, 49 of Fig. 45.
Figure 50:
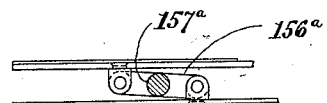
Fig. 50 is a sectional plan view on line 50, 50 of Fig. 47.
Figure 51:
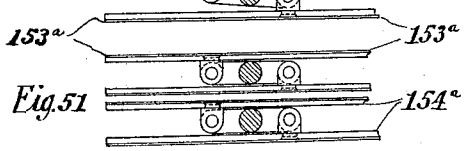
Fig. 51 is the same as Fig. 50 with the parts in another position.

Attached rigidly to the lower ends of conical shafts 208 are rectangular plates 209, see Figs. 47 and 49, in which are secured pins 210 connected by links 211 with levers 212 fast on vertical shafts 213, the lower ends of which are supported by bracket extensions of cylinders 202.

The upper ends of shafts 213 pass through pinions 214 and are rotatably mounted in and collared to bracket extension of cylinders 201. Pinions 214 are in mesh with racks 215 on the ends of bar 216.

Shaft 217 located convenient to the operator's cage 218, has keyed to it hand wheel 219 and also pinion 220, which latter meshes with rack 221 on the central part of bar 216.

A rotation of hand wheel 219 moves bar 216, and racks 215 on it rotate pinions 214, which turn shafts 213 by fast feathers engaging in key ways in the shafts.

The turning of shafts 213 moves levers 212, which by links 211 turn rectangular plate 209 and attached conical shaft 208 which supports it.

These gears and levers are so proportioned that one full turn of hand wheel 219 turns plate 209 through ninety degrees (90°).

The means for gripping and pushing down the bricks shown in Figs. 45, 47, 48, 49, 50 and 51 are practically the same as like means shown in Figs. 36 to 41 inclusive, and as these have been described in detail I have simply given like parts in the first mentioned figures the same numbers as the parts in the latter mentioned figures with index letters "a" added and omit describing same.

Gripping plates 153$^a$ and push down bars 164$^a$ and solenoids 163$^a$ are all carried in frame 149$^a$, which is rigidly attached to rectangular plate 209 carrying solenoid 163$^a$.

For simplicity means for gripping bricks in double rows as shown in Fig. 41 are omitted in Figs. 45, 47, 48, 49, 50 and 51, but these are applicable to same.

Figure 44:
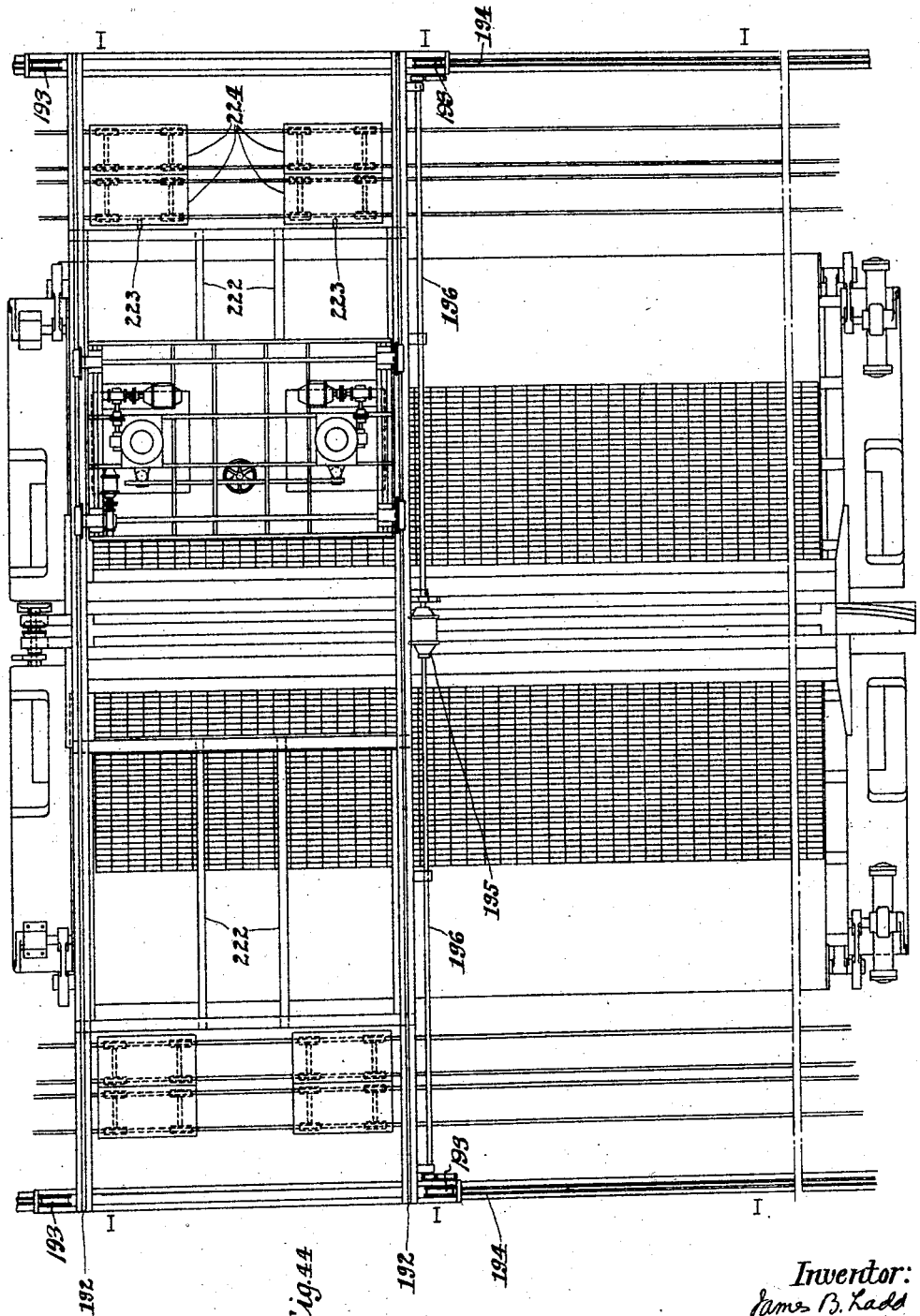
Fig. 44 is a plan view of Fig. 43.

Referring to Figs. 42, 43 and 44, stripping bars 222, rigidly supported from crane girders 192, are carried just clear of the tops of the bricks on the hacking table. As shown in Fig. 43 there are two sets of bars 222, one over each hacking table.

Referring to Figs. 43 and 44, latches 223 adapted to engage with cars 224 are attached to the rigid frame extending down from girders 192. These latches 223 are so located that cars engaged by them are spotted opposite the center of the brick lifting means as shown in Fig. 44, and the cars are moved along by them when the crane is moved.

Figure 45:
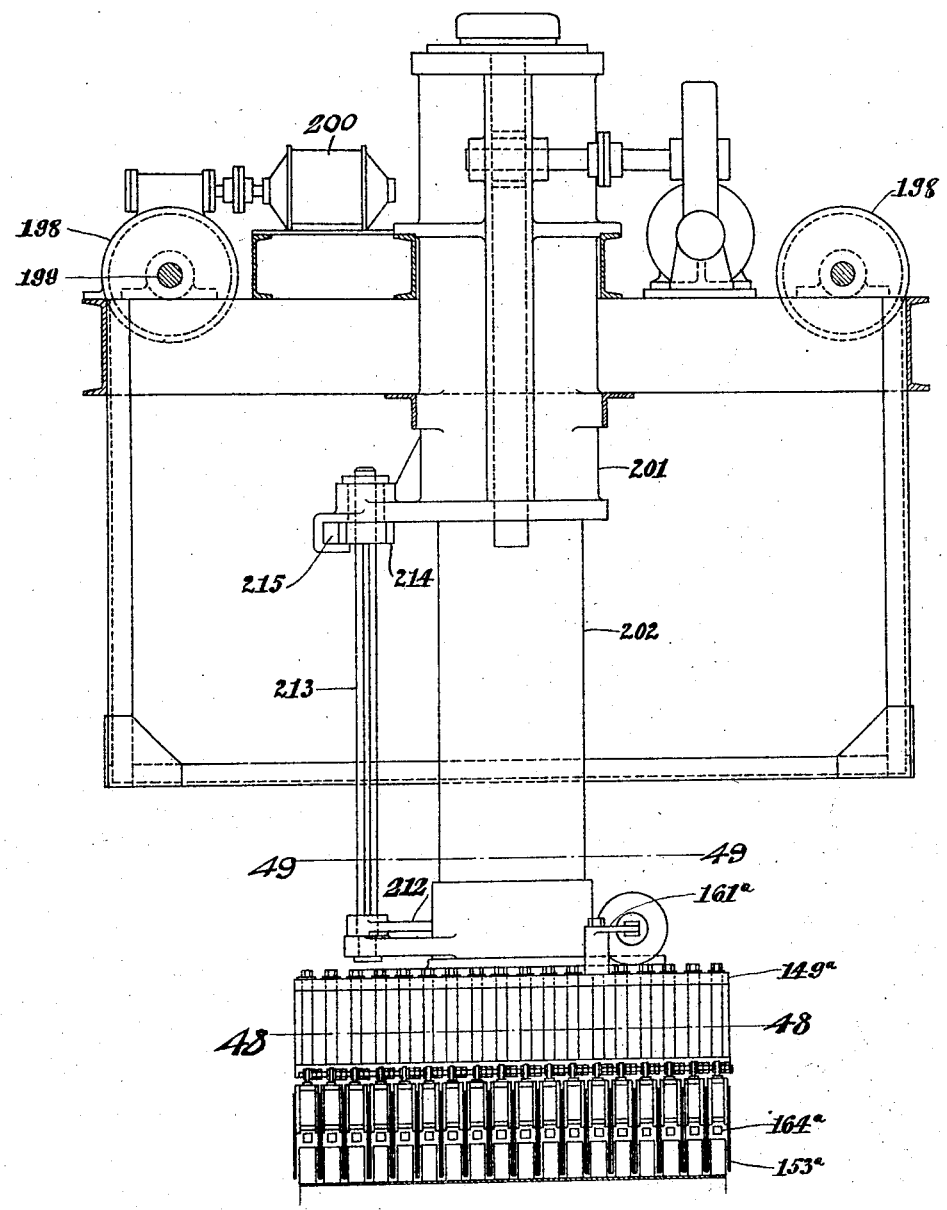
Fig. 45 is an elevation of lifting means No. 2 partly in section.
Figure 46:
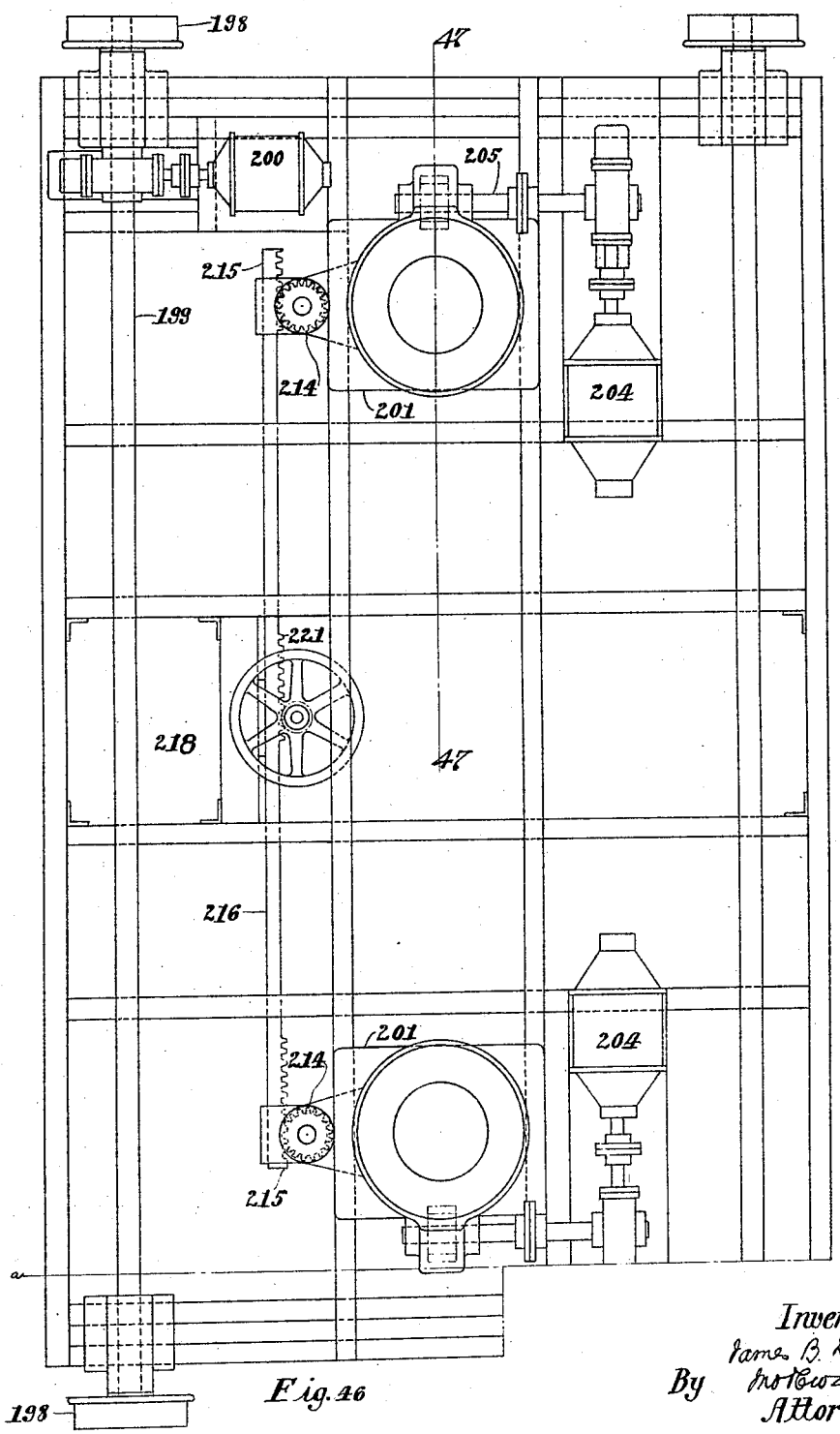
Fig. 46 is a plan view of Fig. 45.

Lifting means No. 2 described in detail above is shown for illustration in Figs. 42, 43 and 44 over hacking tables filled with bricks by assembling means No. 1. The brick gripping plates 153ª are for example proportioned to lift bricks in squares of eighteen (18) rows of six (6) bricks per row, as shown in Figs. 45 and 49.

As the operation of gripping and lifting the bricks from the hacking tables will be clearly understood from the operation of like means previously described, to illustrate the working of this machine I shall start with it in the position shown in Figs. 42 and 43, which show two squares of bricks gripped and raised above the hacking table.

Starting as above, trolley 197 is moved over cars 224 and a layer of bricks is deposited on each car.

Trolley 197 is then moved back to its initial position over the hacking table and the bridge is moved to the left from its position in Fig. 42 a distance equal to the length of six bricks, and the lifting plates are then lowered again and another pair of squares of brick are lifted up from the hacking table.

This second pair of squares of bricks are then moved over cars 224, and while so moving they are rotated through ninety degrees (90°) by hand wheel 219, and thus they are deposited on the cars at right angles with the preceding layer.

These movements are repeated until the cars are fully loaded, and then loading of other cars is begun and the loaded cars are removed and replaced by empty ones.

During the loading of cars as above, the cars being loaded are always attached to the bridge 192 by latches 223, and are thus always in correct positions for receiving bricks.

Referring to Fig. 42, during the raising of bricks from the hacking table their ends tend to lift up the abutting bricks remaining on the table, and stripping bars 222 perform the important duty of holding the bricks down onto the table and preventing spawling and distortion during the lifting of abutting brick.

To be thoroughly effective, stripping bars 222 are located very close to the tops of the bricks and with their edges close to the ends of the bricks to be lifted.

While the drawings show means for lifting two squares of bricks, the means described may be constructed for handling either one square or any number of squares of bricks, and likewise by this means bricks may be loaded at the same time onto any number of cars.

Gripping plates referred to herein, such as 71 in Fig. 24 or 153 in Fig. 38, are preferably thin plates but not necessarily flexible, as for handling very soft bricks I use rigid stiff plates, whereas for comparatively firm bricks, varying appreciably in thickness, I use flexible plates.

As the gripping plates serve also as side guides for the bricks I preferably use continuous plates, and when flexiblity is desirable I slot them as in Fig. 52, or use numerous plates as in Fig. 53.

In that the means herein shown and described move the gripping plates positively and forcibly against the bricks and the plates are maintained always parallel with each other, it is evident that stiff plates embossed as in Fig. 54 will serve to form patterns or number or letters, etc. on the sides of the bricks.

To insure positive withdrawal from the sides of the bricks of such patterns, the push down bars are in this case fitted with thin projections, knife like blades 224 which are forced down into the bricks as in Fig. 55, before the gripping plates are moved. These projections 224, Figs. 54, 55 and 56, hold the bricks securely during the withdrawal of the gripping plates, and the slight incisions in the top of the bricks are not objectionable.

From the drawings and description herein it is clear that the gripping plates may be brought down in contact with the hacking tables and that the push down bars may be made as wide as the bricks are thick, and accordingly the bricks may thus be entirely incased by moving the push down bars down on top of them.

When so incased, the bricks may be practically repressed by forcing down the push down bars and at the same time forcing the gripping plates together.

Such repressing of the bricks while abutted end to end in long rows I consider new and shall claim.

It is of course understood that the solenoids, fluid cylinders, motors, etc. shown in the drawings are for example only and that at any point other means may be used to give the desired motions.

Referring particularly to lifting means No. 1, for clearness in description, I have shown numerous solenoids but in practice all of the operations of handling eight squares of bricks may be accomplished by six (6) solenoids or their equivalent, instead of the thirty-five (35) solenoids shown in the drawings.

What I claim is:—

1. The method of loading and hacking bricks, which consists in the following steps, moving bricks in the direction of their length, bringing the bricks to rest abutted end to end in rows greater in length than a car, assembling said rows in parallel relationship, sufficient in number to form a layer the full width of the car, and transferring to the car at one operation, such part of said assembled rows as shall form a complete layer for the car.

2. The method of hacking bricks onto cars which consists in the following steps, moving bricks in the direction of their length, bringing the bricks to rest abutted end to end in rows greater in length than a car, assembling said rows in parallel relationship, sufficient in number to form a layer the full width of the car, transferring to the car at one operation, such part of said assembled rows as shall form a complete layer for the car, and depositing succeeding layers onto preceding layers in such relationship with respect to the direction of rows as required.

3. The method of hacking bricks onto cars which consists in the following steps, moving bricks in the direction of their length, bringing the bricks to rest abutted end to end in rows greater in length than a car, assembling said rows in parallel relationship, sufficient in number to form a layer the full width of the car and transferring to several cars at one operation sections of said rows to form complete layers for each car.

4. The method of hacking bricks onto cars which consists in the following steps, moving bricks in the direction of their length, bringing the bricks to rest abutted end to end in rows greater in length than a car, assembling said rows in parallel relationship, sufficient in number to form a layer the full width of the car, lifting the entire charge so assembled, and depositing the same on a plurality of cars so as to form a complete layer on each car with each delivery.

5. The method of hacking bricks onto cars which consists in the following steps, moving bricks in the direction of their length, bringing the bricks to rest abutted end to end in rows greater in length than a car, assembling said rows in parallel relationship, sufficient in number to form a layer the full width of the car, lifting the entire charge so assembled and separating the same into lots, each lot comprising a complete layer for a car, and depositing said lots onto a plurality of cars in a single operation.

6. In brick loading and hacking apparatus, the combination with a car, of means for moving bricks in the direction of their length, means for bringing the bricks to rest abutted end to end in rows longer than a car, and means for assembling the rows in parallel relationship, sufficient in number to form a layer the full width of the car.

7. In apparatus for hacking bricks onto cars, the combination with a car of means for moving bricks in the direction of their length, means for bringing the bricks to rest abutted end to end in rows longer than a car, and means for assembling the rows in parallel relationship, sufficient in number to form a layer the full width of the car, and means for transferring and depositing the bricks in full layers onto cars.

8. In apparatus for hacking bricks onto cars, the combination with cars, of means for moving bricks in the direction of their length, means for bringing the bricks to rest abutted end to end in rows longer than a car, and means for assembling the rows in parallel relationship sufficient in number to form a layer the full width of the car, and means for transferring and depositing the bricks in full layers onto a plurality of cars at one operation.

9. In apparatus for hacking bricks onto cars, the combination with cars, of means for moving bricks in the direction of their length, means for bringing the bricks to rest abutted end to end in rows longer than a car, and means for assembling the rows in parallel relationship, sufficient in number to form a layer the full width of the car, and means for transferring and depositing the bricks in full layers onto cars and for depositing succeeding layers onto preceding layers in such relationship, with respect to the direction of rows, as required.

10. In apparatus for hacking bricks onto cars, the combination with cars, of means for moving bricks in the direction of their length, means for bringing the bricks to rest abutted end to end in rows longer than a car, means for preventing the forward movement of some of the bricks in order to give an interval of time for changing the direction of motion of the bricks, and means for assembling the rows in parallel relationship, sufficient in number to form a layer the full width of the car.

11. In apparatus for hacking bricks onto cars, the combination of two conveyors, means for moving bricks in the direction of their length, and means for delivering the bricks and bringing the same to rest in rows abutted end to end, upon said conveyors alternately.

12. In apparatus for hacking bricks onto cars, the combination of a plurality of conveyors, one conveyor adapted to move bricks in a row, means for shifting the direction of movement of said bricks so that the same shall be delivered to each of two or more other conveyors in succession.

13. In apparatus for hacking bricks onto cars, the combination of a plurality of conveyors, one conveyor adapted to move bricks in a row, means for shifting the direction of movement of said bricks so that the same shall be delivered to each of two or more other conveyors in succession, and means for arresting the movement of said bricks from time to time as required in order to secure an interval of time in which to shift the direction of movement.

14. In apparatus for hacking bricks onto cars, the combination of a plurality of conveyors, one conveyor adapted to move bricks in a row, means for shifting the direction of movement of said bricks on said conveyor at required intervals so that the same shall be delivered to another conveyor in successive parallel rows.

15. In apparatus for hacking bricks onto cars, the combination of a plurality of conveyors, one conveyor adapted to move bricks in a row, means for shifting the direction of movement of said bricks on said conveyors at required intervals so that the same shall be delivered to another conveyor in successive parallel rows, and means for arresting the movement of said bricks in order to secure an interval of time in which to shift the direction of movement.

16. In apparatus for hacking bricks onto cars, the combination of a plurality of conveyors, one conveyor adapted to move bricks in a row, means for shifting the direction of movement of said bricks on said conveyors at required intervals so that the same shall be delivered to another conveyor in successive parallel rows, and means for causing said bricks to abut end to end in said rows.

17. In brick loading and hacking apparatus, the combination with cars of means for moving bricks in the direction of their lengths, means for bringing the bricks to rest abutted end to end in rows longer than a car, means for assembling the rows in parallel relationship, sufficient in number to form a layer the full width of the car, and means for lifting en bloc said bricks in the number and arrangement required for full layers for a plurality of cars.

18. In brick loading and hacking apparatus, the combination with cars of means for moving bricks in the direction of their lengths, means for bringing the bricks to rest abutted end to end in rows longer than a car, means for assembling the rows in parallel relationship, sufficient in number to form a layer the full width of the car, means for lifting en bloc said bricks in the number and arrangement required for full layers for a plurality of cars, and means for separating the same into lots, after lifting, each lot representing a layer for one car.

19. In brick loading and hacking apparatus, the combination with cars of means for moving bricks in the direction of their lengths, means for bringing the bricks to rest abutted end to end in rows longer than a car, means for assembling the rows in parallel relationship, sufficient in number to form a layer the full width of the car, means for lifting en bloc said bricks in the number and arrangement required for full layers for a plurality of cars, means for separating the same into lots, after lifting, each lot representing a layer for one car, and means for causing relative rotative movement between succeeding layers as the same are deposited one upon another.

20. In brick loading and hacking apparatus, the combination with cars of means for moving bricks in the direction of their lengths, means for bringing the bricks to rest abutted end to end in rows longer than a car, means for assembling the rows in parallel relationship, sufficient in number to form a layer the full width of the car, means for lifting en bloc said bricks in the number and arrangement required for full layers for a plurality of cars, means for separating the same into lots, after lifting, each lot representing a layer for one car, and means for depositing alternate lots upon the cars.

21. In brick loading and hacking apparatus, the combination with cars of means for moving bricks in the direction of their lengths, means for bringing the bricks to rest abutted end to end in rows longer than a car, means for assembling the rows in parallel relationship, sufficient in number to form a layer the full width of the car, means for lifting en bloc said bricks in the number and arrangement required for a full layer for a car, means for transferring said layer to a car, and means for causing the required relative movement between the transferring means and the car to facilitate the proper depositing of the layer.

22. The method of hacking bricks which consists in depositing square lots of properly spaced bricks on the combined surfaces of a plurality of cars forming an approximately corresponding square area, and then separating the cars to facilitate drying the bricks.

23. In a brick hacking mechanism the combination of means for causing a flow of bricks from an off-bearing belt, means for assembling said bricks, a plurality of receiving cars adapted to be associated to form a single substantially square receiving area, and means for depositing lots of assembled bricks in corresponding square areas on said assembled cars.

24. In a brick hacking mechanism the combination of means for causing a flow of bricks from an off-bearing belt, means for assembling said bricks, a plurality of receiving cars adapted to be associated to form a single substantially square receiving area, means for depositing lots of assembled bricks in corresponding square areas on said assembled cars and means whereby the cars may be translated and partly rotated.

25. In a brick hacking machine, the combination of a plurality of receiving belts, means for causing the bricks to flow from an off-bearing belt onto a receiving belt until the receiving belt has become filled with bricks all abutting end to end, means for diverting the flow of bricks to another receiving belt and at the same time bringing the first receiving belt to rest, means for transferring bricks from the first receiving belt during the filling of the second receiving belt.

26. The combination of a receiving belt and a hacking belt, means for causing bricks to move from an off-bearing belt to the receiving belt, means for shifting the bricks transversely from the receiving belt to the hacking belt and means for moving the hacking belt with a charge.

27. The combination of means for causing bricks to move from an off-bearing belt to a receiving belt, means for arresting the bricks on the receiving belt abutted end to end, means for shifting the bricks transversely from the receiving belt to the hacking belt and means for moving the hacking belt with a charge beyond the transferring means.

28. The combination of a plurality of receiving belts and hacking belts, means for causing a flow of bricks from an off-bearing belt to a receiving belt, means for shifting the flow from one receiving belt to another, means for transferring the bricks from a receiving belt to a hacking belt while bricks are being delivered to another receiving belt, and automatically operated means for actuating a hacking belt when fully charged to carry the charge clear of the transferring means.

29. The combination of a plurality of receiving belts and hacking belts, means for causing a flow of bricks from an off-bearing belt to a receiving belt, means for shifting the flow from one receiving belt to another, means for transferring the bricks from a receiving belt to a hacking belt while bricks are being delivered to another receiving belt, automatically operated means for actuating a hacking belt when fully charged to carry the charge clear of the transferring means, and means for arresting the charge of bricks on the hacking belt with the ends of the rows in alinement.

30. The combination of a plurality of receiving belts and hacking belts, means for causing a flow of bricks from an off-bearing belt to a receiving belt, means for shifting the flow from one receiving belt to another, means for transferring the bricks from a receiving belt to a hacking belt while bricks are being delivered to another receiving belt, and automatically operated means controlled by the operation of the transferring means for actuating a hacking belt when fully charged to carry the charge clear of the transferring means.

31. The combination of a plurality of receiving belts and hacking belts, means for causing a flow of bricks from an off-bearing belt, means for switching the flow from one receiving belt to another and means for transferring the charge delivered to a receiving belt to the hacking belt, said transferring means being automatically controlled by the switching means.

32. The combination of a plurality of receiving belts and hacking belts, means for causing a flow of bricks from an off-bearing belt, means for switching the flow from one receiving belt to another and means for transferring the charge from a receiving belt to a hacking belt, said transferring means being automatically controlled by the switching means, and automatically operated means controlled by the shifting means for actuating the hacking belts.

33. The combination with a plurality of receiving means, means for causing a flow of bricks from the brick machine to a receiving means, means for side guiding said flow, means for switching the flow from one receiving means to another, and means for arresting the flow of bricks to secure an interval of time to permit the switching operation.

34. The combination with a plurality of receiving means, means for causing a flow of bricks from the brick machine, means for side-guiding said flow, means for switching the flow from one receiving means to another and means for arresting said flow to secure an interval of time to permit the switching operation.

35. In combination with brick producing means, a conveyor belt and a plurality of receiving belts, means for guiding the bricks on the conveyor belt and on the receiving belt, means for switching the flow of bricks from the conveyor belt to alternate or successive receiving belts and means for arresting the flow in order to secure a period of time in which to operate the switching means.

JAMES B. LADD.